(12) United States Patent
Sassin

(10) Patent No.: US 11,494,688 B2
(45) Date of Patent: Nov. 8, 2022

(54) LEARNING ETL RULES BY EXAMPLE

(71) Applicant: Oracle International Corporation, Redwood Shores, CA (US)

(72) Inventor: Michael Sassin, Andover, MA (US)

(73) Assignee: Oracle International Corporation, Redwood Shores, CA (US)

(*) Notice: Subject to any disclaimer, the term of this patent is extended or adjusted under 35 U.S.C. 154(b) by 1219 days.

(21) Appl. No.: 15/953,873

(22) Filed: Apr. 16, 2018

(65) Prior Publication Data

US 2019/0318272 A1    Oct. 17, 2019

(51) Int. Cl.
*G06N 20/00*    (2019.01)
*G06N 5/02*    (2006.01)
*G06F 16/21*    (2019.01)
*G06F 16/25*    (2019.01)

(52) U.S. Cl.
CPC ........... *G06N 20/00* (2019.01); *G06F 16/211* (2019.01); *G06F 16/254* (2019.01)

(58) Field of Classification Search
CPC ...... G06N 20/00; G06F 16/211; G06F 16/254
USPC ......................................................... 706/12
See application file for complete search history.

(56) References Cited

U.S. PATENT DOCUMENTS

| | | | | |
|---|---|---|---|---|
| 2013/0117217 A1* | 5/2013 | Bhide | ................... | G06F 16/254 707/602 |
| 2016/0078064 A1 | 3/2016 | Sassin | | |
| 2017/0075918 A1 | 3/2017 | Bates-Haus et al. | | |
| 2017/0116307 A1* | 4/2017 | Kapoor | ................. | G06F 16/283 |
| 2017/0220654 A1* | 8/2017 | De | ........................ | G06F 16/211 706/12 |

OTHER PUBLICATIONS

Münch et al.: "Robot Programming by Demonstration (RPD): Supporting the Induction by Human Interaction", Received Oct. 1, 1994 (Year: 1994).*
Doan et al.: "Reconciling Schemas of Disparate Data Sources: A Machine Learning Approach", ACM SIGMOD May 21-24, 2001 (Year: 2001).*
Doan et al., "Reconciling schemas of disparate data sources", Internet ACM SIGMOD, May 1, 2001, pp. 509-520, XP058342012.

(Continued)

*Primary Examiner* — Kuen S Lu
(74) *Attorney, Agent, or Firm* — Potomac Law Group, PLLC

(57) ABSTRACT

Embodiments provide systems and methods for learning extract, transform, and load mappings by example. A plurality of features can be extracted from a source schema and a target schema. Example ETL mappings can be provided to a machine learning algorithm that comprise definitions for extracting data from source tables and loading the extracted data into target tables. Using the machine learning algorithm and based on the source schema, target schema, and extracted features, one or more ETL rules can be predicted that define logic for extracting data from the source schema and loading the extracted data into the target schema. Additional ETL mappings can be generated based on the predicted ETL rules, the additional ETL mappings providing additional definitions for extracting data from the source schema and loading the extracted data into the target schema.

20 Claims, 9 Drawing Sheets

(56) References Cited

OTHER PUBLICATIONS

International Preliminary Report issued in the corresponding International Application No. PCT/US2019/026891, dated Oct. 20, 2020.
Sassin et al., Dialog-Based Learning (DBL) for Adaptive Interface Agents and Programming-by-Demonstration Systems, Technical Report CMU-CS-93-175, Carnegie Mellon University, Jul. 1993.

* cited by examiner

```xml
<Transformation>
    <Name>HDI_ACC_ENT_HDM_ACC_ENT</Name>
    <FolderName>DI_HDWF_INITIAL_LOAD/Load_DI_HDWF_INITIAL_LOAD_HDI_ACC_ENT</FolderName>
    <PackageList>HDI_ACC_ENT_HDM_ACC_ENT<PackageList>
    <Datasets>
        <Datasets>
            <Source>
                <Name>HDI_ACC_ENT_</Name>
                <Filter>1=1 AND ( (HDI_ACC_ENT. INSERT_DT between
                to_date ('#OHADI. VAR_ACC_ENT_LAST_EXTRACT_DATETEST',
                'MM/DD/YYYY HH24:MI:SS') and
                to_date ('#OHADI. VAR_ACC_ENT_EXTRACT_TO_DATETEST',
                'MM/DD/YYYY HH24:MI:SS') ) ) </Filter>
                <FilterExecutionLocation>SOURCE</FilterExecutionLocation>
                <JoinType>INNER</JoinType>
                <Lookups>
                    <Lookup>
                        <LookupDataStore>HDM_CHRTFLD_COMB</LookupDataStore>
                        <Alias>CHRTFLD_COMB_ID_CURRENT</Alias>
                        <Join>HDI_ACC_ENT. CHRTFLD_COMB_INT_ID=CHRTFLD_
                        COMB_ID_CURRENT. INTEGRATION_ID AND
                        HDI_ACC_ENT. CHRTFLD_COMB_DAT_SRC_NUM_
                        ID=CHRTFLD_COMB_ID_CURRENT. DATASOURCE_NUM_ID
                        AND CHRTFLD_COMB_ID CURRENT. CURRENT_FLG='Y'
                        </Join>
                        <Journalized>false</Journalized>
                        <SubSelect>false</SubSelect>
                    </Lookup>
                    <Lookup>
                        <LookupDataStore>HDM_FSCL_PD</LookupDataStore>
                        <Alias>FSCL_FD_ID_CURRENT</Alias>
                        <Join>HDI_ACC_ENT. FSCL_FD_INT_ID=FSCL_FD_ID_
                        CURRENT. INTEFRATION_ID AND
                        HDI_ACC_ENT. FSCL_FD_DAT_SRC_NUM_ID=FSCL_FD_ID_
                        CURRENT. DATASOURCE_NUM_ID AND
                        FSCL_FD_ID_CURRENT. CURRENT_FLG='Y'</Join>
                        <Journalized>false</Journalized>
                        <SubSelect>false</SubSelect>
                    </Lookup>
                    <Lookup>
                        <LookupDataStore>HDM_GOV_ORG</LookupDataStore>
                        <Alias>GOV_ORG_ID_CURRENT</Alias>
                        <Join>HDI_ACC_ENT.GOV ORG_INT_ID=GOV_ORG_ID_
                        CURRENT.INTEGRATION_ID AND
                        HDI_ACC_ENT. GOV_ORG_DAT_SRC_NUM_ID=GOV_ORG_
                        ID_CURRENT. DATASOURCE_NUM_ID AND
                        GOV_ORG_ID_CURRENT. CURRENT_FLG='Y'</Join>
                        <Journalized>false</Journalized>
                        <SubSelect>false</SubSelect>
                    </Lookup>
```

FIG. 4

| Attributes: | |
|---|---|
| Name | Expression /— 702 |
| ACC_ENT_ID | decode('#OHADI.VAR_VERSIONINGTEST', 'NO', decode((n |
| CHRTFLD_COMB_ID | Get_Mandatory_FK(D1CHRTFLD_COMB_ID_EFF_DATE_C| |
| FSCL_PD_ID | Get_Mandatory_FK(D1FSCL_PD_ID_EFF_DATE.FSCL_PD_ |
| GOV_ORG_ID | Get_Non_Mandatory_FK(D1GOV_ORG_ID_EFF_DATE. GO |
| ACC_ENT_LN_SUBTYP_ID | Get_Standard_Code_ID_subtyp(D1HDI_ACC_ENT. SUBTY |
| ACC_ENT_LN_TYP_ID | Get_Standard_Code_ID_subtyp(D1HDI_ACC_ENT. ACC_I |
| ACC_ENT_STCD_ID | Get_Standard_Code_ID_subtyp(D1HDI_ACC_ENT. ACC_I |
| CURR_CD_ID | Get_Standard_Code_ID_subtyp(D1HDI_ACC_ENT. CURR |
| ACC_ENT_ADDED_DT | D1HDI_ACC_ENT.ACC_ENT_ADDED_DT |
| ACCTG_DT | D1HDI_ACC_ENT.ACCTG_DT |
| ACC_ENT_AMT | D1HDI_ACC_ENT.ACC_ENT_AMT |
| STAT_AMT | D1HDI_ACC_ENT.STAT_AMT |
| STAT_AMT_UOMCD_ID | Get_Standard_Code_ID_subtyp(D1HDI_ACC_ENT.STAT_ |
| FRGHT_AMT | D1HDI_ACC_ENT.FRGHT_AMT ← |
| DSCNT_AMT | D1HDI_ACC_ENT.DSCNT_AMT   704 |
| MISC_AMT | D1HDI_ACC_ENT.MISC_AMT |
| EXCS_RCVRY_AMT | D1HDI_ACC_ENT.EXCS_RCVRY_AMT |
| EXCS_NON_RCVRD_AMT | D1HDI_ACC_ENT.EXCS_NON_RCVRD_AMT   706 |
| ACC_ENT_LN_QTY | D1HDI_ACC_ENT.ACC_ENT_LN_QTY ← |
| ACC_ENT_LN_QTY_UOMCD_ID | Get Standard_Code_ID_subtyp(D1HDI_ACC_ENT.ACC_I |
| ORIG_ACC_ENT_LN_SUBTYP_... | Get_Original_Code_ID(D1HDI_ACC_ENT.SUBTYP_CD,D1 |
| ORIG_ACC_ENT_LN_TYP_ID | Get_Original_Code_ID(D1HDI_ACC_ENT.ACC_ENT_LN_ |
| ORIG_ACC_ENT_STCD_ID | Get_Original_Code_ID(D1HDI_ACC_ENT.ACC_ENT_STU |
| ORIG_CURR_CD_ID | Get_Original_Code_ID(D1HDI_ACC_ENT.CURR_CD,D1H |
| ORIG_STAT_AMT_UOMCD_ID | Get_Original_Code_ID(D1HDI_ACC_ENT.STAT_AMT_UO |
| ORIG_ACC_ENT_LN_QTY_UO... | Get_Original_Code_ID(D1HDI_ACC_ENT.ACC_ENT_LN_ |
| CREATED_BY_ID | nvl(D1HDM_USER_CREATED_BY_ID.USER_ID,#OHADI.V |
| CHANGED_BY_ID | nvl(D1HDM_USER_CHANGED_BY_ID.USER_ID,#OHADI.V |
| CREATED_ON_DT | D1HDI_ACC_ENT.SRC_CREATED_ON_DT |
| CHANGED_ON_DT | D1HDI_ACC_ENT.SRC_CHANGED_ON_DT |
| INSERT_DT | DECODE('#OHADI.VAR_VERSIONINGTEST','NO',DECODE |
| UPDATE_DT | sysdate ← 708 |

FIG. 7

LEARNING ETL RULES BY EXAMPLE

FIELD

The embodiments of the present disclosure generally relate to learning extract, transform, and load mappings by example.

BACKGROUND

The proliferation of computing and connected devices has generated vast amounts of data that requires management. One aspect of data management that is often performed by a human, such as a data scientist, is extract, transform, and load ("ETL") or extract, load, and transform ("ELT"), which will be used interchangeably throughout this disclosure. Generally, ETL is one step of a larger data migration process that moves data from a source schema to a target schema. This migration process often has multiple layers, such as table/column mappings, extraction and loading rules/mappings (e.g., join conditions, unit of work determination, and the like), post-migration and/or pre-migration transformations, to name a few. As a result, while other aspects of data management have become agile and efficient, ETL can be a cumbersome process when leveraging modern day conventional techniques.

SUMMARY

The embodiments of the present disclosure are generally directed to systems and methods for learning extract, transform, and load mappings by example that substantially improve upon the related art.

In some embodiments, a plurality of features can be extracted from a source schema and a target schema, the features comprising at least columns of a plurality of tables of the source schema and the target schema. Example ETL mappings can be provided to a machine learning algorithm, wherein the example ETL mappings comprise definitions for extracting data from one or more tables of the source schema and loading the extracted data into one or more tables of the target schema. Using the machine learning algorithm and based on the source schema, target schema, and extracted features, one or more ETL rules can be predicted that define logic for extracting data from the source schema and loading the extracted data into the target schema. Additional ETL mappings can be generated based on the predicted ETL rules, the source schema, the target schema, and the extracted features, the additional ETL mappings providing additional definitions for extracting data from one or more tables of the source schema and loading the extracted data into one or more tables of the target schema.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 4 illustrates a sample ETL specification according to an example embodiment.

FIG. 7 illustrates a sample ETL mapping expressions according to an example embodiment.

DETAILED DESCRIPTION

Embodiments learn extract, transform, and load mappings by example. The relationship between a source schema and a target schema can often be complex, thus making machine learning applications for ETL non-trivial. Embodiments leverage feature extraction for a source data schema and target data schema that provide granular level data points to the machine learning algorithms that enables improved learning. Further, example mappings between the source and target data schemas are provided to the machine learning algorithms that are defined according to a ETL framework. As a result, the machine learning algorithms can extrapolate trends based on the relationships illustrated between the target schema and source schema in the examples. These extrapolated trends can be defined at a detailed level that is conducive to machine prediction because they are defined at a granular level that is specific to the schemas. Subsequently, the machine learning algorithm can predict new ETL rules that can be used to accomplish the migration of data from the source to the target. A rules interpreter can then be leveraged to generate ETL mappings based on the precited new ETL rules.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
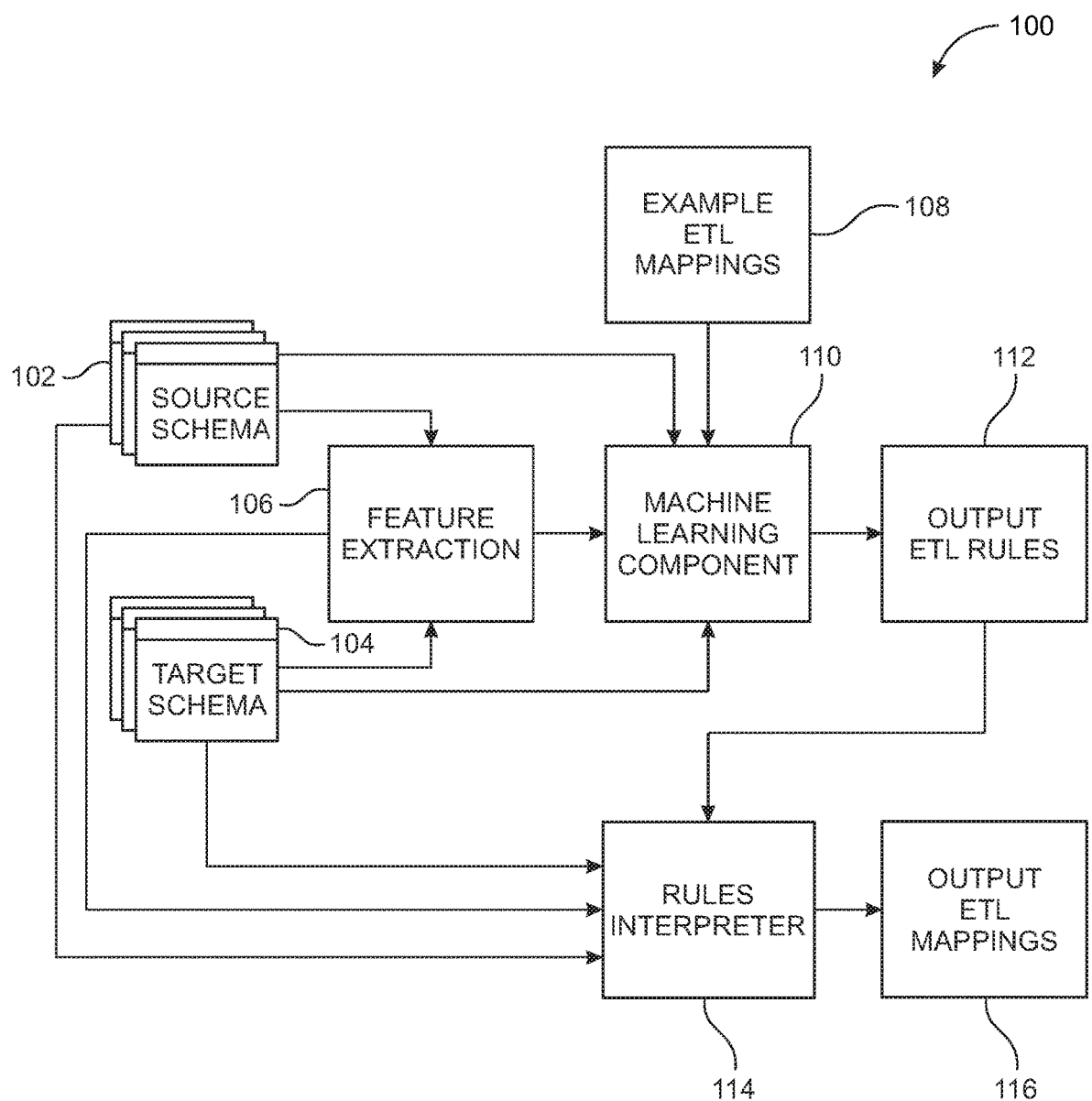
FIG. 1 illustrates a system for learning extract, transform, and load mappings by example according to an example embodiment.

FIG. 1 illustrates a system for learning extract, transform, and load mappings by example according to an embodiment. System 100 includes source schema 102, target schema 104, feature extraction 106, example ETL mappings 108, machine learning component 110, output ETL rules 112, rules interpreter 114, and output ETL mappings 116. Source schema 102 and target schema 104 can be any data schema for storing data, such a relational data tables, flat files, NoSQL databases, message queues or topics, event streams, or a combination of these. For example, source schema 102 and/or target schema 104 can include a set of relational tables configured according to a set of rules or standards, such as a Third Normal Form ("3NF") schema.

Generally, each schema will include data tables with one or more columns of data. The schema is defined not only by the tables and the data they store, but the relationships between the tables. For example, a relationship between a first table and a second table can be defined by a foreign key that links the data stored in each of the tables. In some embodiments, two tables may share multiple relationships (e.g., can have multiple foreign keys that define relationships between the tables). Different types of relationships between tables will be further disclosed herein.

The design of a data schema can often vary based on the designer. For example, a given set of data with a given set of relationships can be successfully represented by a number of data schemas with varying designs. Some designs may require a table join to retrieve a certain set of data while the other designs do not. In addition, many legacy systems implement schema design that is not readily implemented by currently known databases. When considering how to extract data from a source schema and load that data to a target schema, fine grain details, such as naming conventions for tables, columns, and keys, among other detail, play an important role in rules/mappings building. Due to the highly subjective nature of schema design, rules/mappings that extract, load, and/or transform data stored in source schema 102 into target schema 104 can be specific to these schemas.

In embodiments, in order to configure machine learning component 110 to generate accurate rules prediction, feature extraction 106 is performed on source schema 102 and target schema 104. For example, feature extraction 106 can be used to provide machine learning component 110 the fine grain detail that enables ETL rules/mappings generation. In turn, learning component 110 can analyze at this fine granularity to predict the schema specific rules/mappings for source schema 102 and target schema 104. The features extracted for each schema can include table names, column names, table type, foreign keys between tables, self-referential tables, and a number of other features. These extracted features can express generic, commonly used structures or patterns in the schemas, can enhance the schema information, and can simplify the work for machine learning component 110.

Embodiments also provide the features extracted by feature extraction 106 to rules interpreter 114. For example, rules interpreter 114 can leverage the extracted features to interpret the predicted rules to generate output ETL mappings 116. The features available for extraction by feature extraction 106 will be further disclosed herein.

Embodiments provide machine learning component 110 with example ETL mappings 108 for the extraction of data from source schema 102 and the loading of the data into target schema 104. Example mappings 108 can be specific mappings between data (e.g., tables) of source schema 102 and target schema 104. Since ETL mappings 108 are specific to the specific data migration task (e.g., migrating from source schema 102 to target schema 104), learning component 110 can predict ETL rules for the particular migration task being implemented.

Embodiments pass the generated output ETL rules 112 to rules interpreter 114, which can interpret the rules to generate output ETL mappings 116. For example, machine learning component 110 can generate a rule in the form of one or more conditional statements (e.g., If X and Y, then Z) and rules interpreter 114 can generate actual mappings between source schema 102 and target schema 104 by interpreting these rules. Embodiments provide source schema 102, target schema 104, and extracted features from feature extraction 106 to rules interpreter 114. For example, output ETL rules 112 can be interpreted into output ETL mappings 116 based on the specific structures of source schema 102 and target schema 104, and based on the specific features extracted from these schemas.

In some embodiments, the machine learning complexity introduced by the subjective nature of schema design is mitigated when ETL mappings 108 are provided for a specific mapping between source schema 102 and target schema 104. For example, because the specific training data provided to machine learning component 110 is representative of the design differences between source schema 102 and target schema 104, output ETL rules 112 predicted by machine learning component 110 will be based on these specific design differences rather than being based on generic design differences, which can occur when generic schema relationship training data is used. Rules interpreter 112 can then use these specific rules and generate, using schema 102, target schema 104, and extracted features from feature extraction 106, output ETL mappings that are again specific to source schema 102 and target schema 104. The functionality achieved by embodiments is an automated technique to generate ETL mappings between a specific source schema and a specific target schema which previously required large amounts of human effort.

In some embodiments, source schema 102, target schema 104, feature extraction 106, example ETL mappings 108, machine learning component 110, output ETL rules 112, rules interpreter 114, and output ETL mappings 116 can be implemented by a single system or computing device, distributed across various computing devices and, in some implementations, across various locations, a combination of these, of may be configured in any other suitable manner. In example implementations, elements of system 100 can be, software, hardware, or a combination of these.

Figure 2:
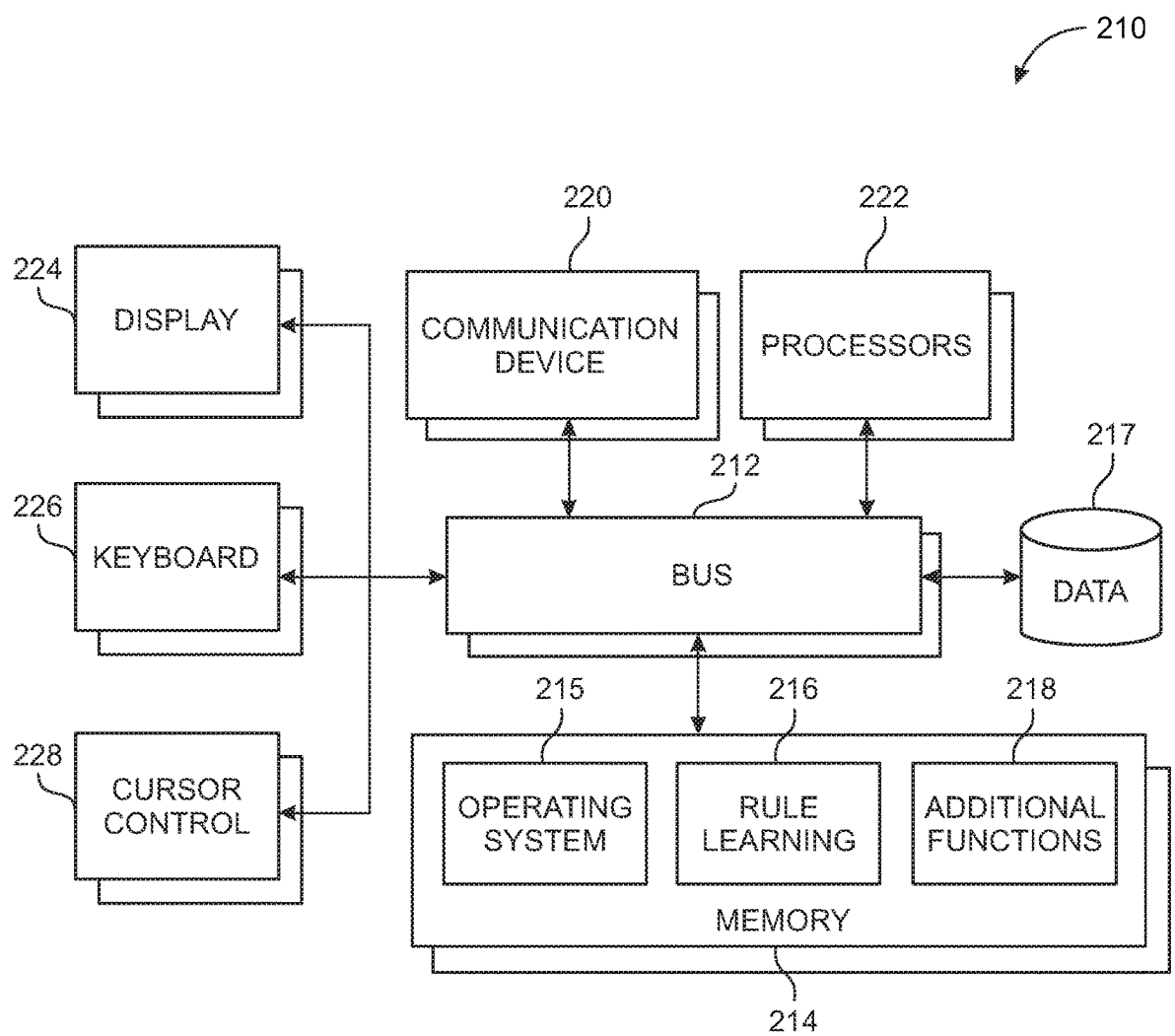
FIG. 2 illustrates a block diagram of a computing device operatively coupled to an ETL learning system according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, learning component 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 210. The modules can include an operating system 215, learning component 216, as well as other applications modules 218. Operating system 215 provides operating system functionality for system 210. Learning component 216 may provide system functionality for predicting ETL rules/mappings that extract data from a source schema and load it into a target schema, or may further provide any other functionality of this disclosure. In some instances, learning component 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210.

In some embodiments, system 210 can be part of a larger system. Therefore, system 210 can include one or more additional functional modules 218 to include the additional functionality. Other applications modules 218 may include various components of a data warehouse that includes operational systems and a data warehouse target, Oracle® Data Integrator ("ODI"), Apache Kafka that can include data changed in a source system based on Oracle® Golden Gate with Change Data Capture ("CDC") mechanisms and Kafka streams-based processing, and other suitable components, for example. A database 217 is coupled to bus 212 to provide centralized storage for modules 216 and 218 and to store, for example, wireless device activity, and in some embodiments, user profiles, transactions history, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

Figure 3:
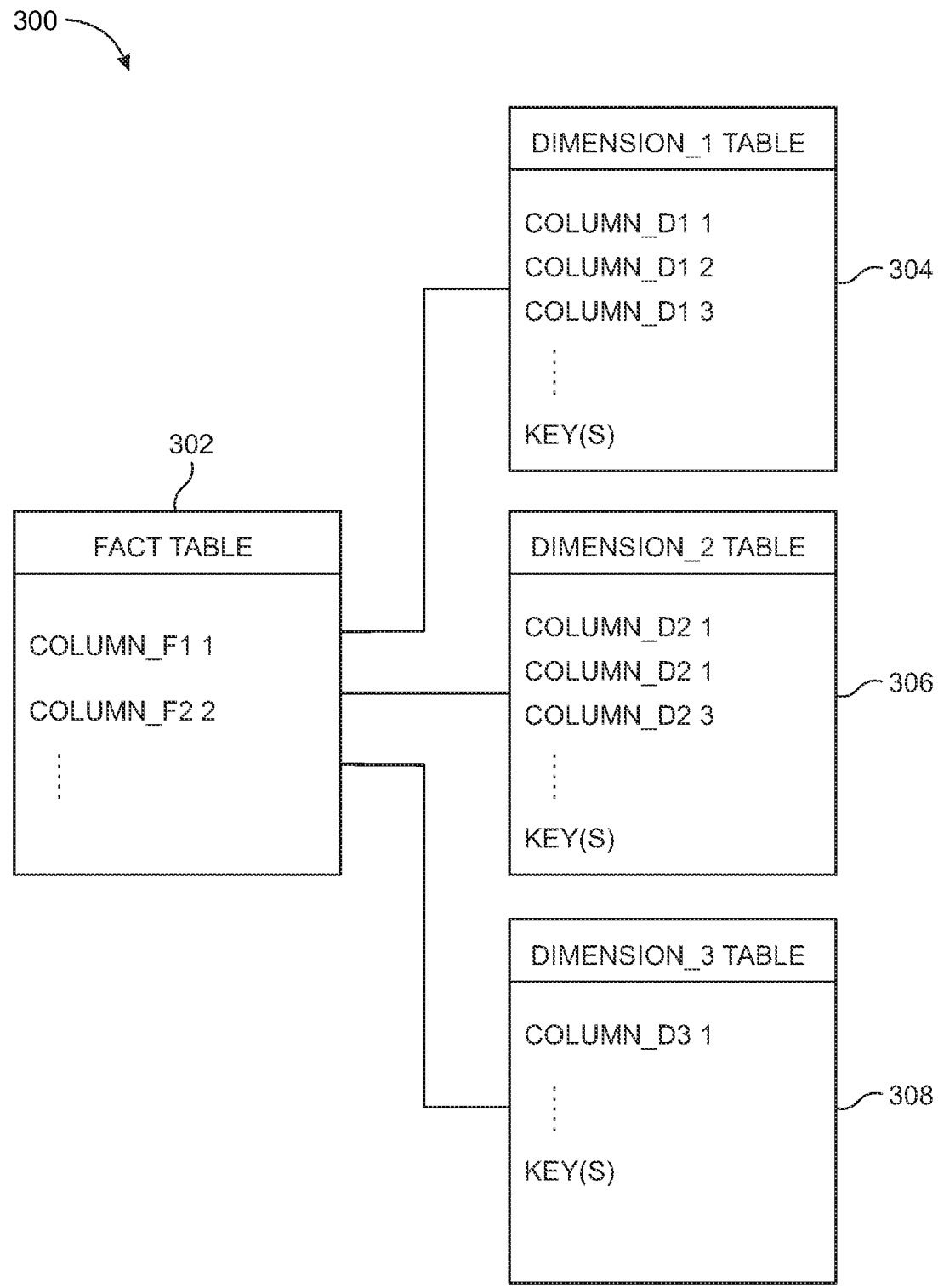
FIG. 3 illustrates a sample star data schema according to an example embodiment.

FIG. 3 illustrates a sample star data schema according to an example embodiment. Data schema 300 includes fact table 302, dimension_1 table 304, dimension_2 table 306, and dimension_3 table 308. Generally, in a star schema, a fact table holds facts about a domain while the dimension table holds attributes for these facts. As a result, fact table 302 has various foreign key relationships with dimension_1 table 304, dimension_2 table 306, and dimension_3 table 308. In other words, some of the rows in the fact table are foreign keys ("FKs"). A foreign key can be a link to a dimension table. A dimension table can be a table that stores context associated with an event that is referred to by one or more fact tables.

A star data schema is similar to a snowflake data schema, with some differences. For example, a snowflake data schema includes dimensions that are normalized into multiple related tables while a star schema has dimensions that are denormalized with each dimension being represented by a single table. Each of these schema provide different advantages related to data redundancy, simplicity of query design, and the like. For example, the storage efficiency benefits of normalization can result in trade-offs to the efficiency of querying a normalized data schema.

Referring back to FIG. 1, machine learning component 110 relies on feature extraction 106 to extract features that describe the measurable and observable properties of source schema 102, target schema 104, and example ETL mappings 108. Features can be specific to the domain and may encapsulate some of the typical aspects of a solution. In general, the more independent features that exist, the more learning is possible. Below are sample features that can be extracted from source schema 102 and target schema 104:

Table or Column Name

Names can be a source for decisions when mapping source to target tables/columns.

Examples features include:
    Source and target table/column names are identical
    Folder name consist of source/target table name with a prefix or postfix
    Mapping name consist of a source or target table name with prefixes and postfixes
    Mapping name consists of source and target name with fixed Strings before, after and between the table names
    Mapping name contain a number that monotonically increase in other columns with similar name
    Source and target tables are similar with a similarity distance of {1, 2, 3, 4, more than 4}
    Column name starts with string "UDF"
    Table ends in "_L" or "_F"
    Column name is "EFFECTIVE DT"

Some of the extracted features will be defined as part of the framework and some features related to specific tables or pre- and postfixes can be created based on the source and target schema.

Column Type

The column type may be used in various ETL rule/mappings making decisions.

Example column features in accordance with various embodiments are:
    Source and target column type are identical
    Source is subtype of target type (e.g., source is VARCHAR(20) and target type is VARCHAR(30))
    Target Column type is "Date"
    Column Belongs to primary key
    Column belongs to foreign key constraint
    Column belongs to foreign key to this table
    Column has "Not Null" constraint
    Table has {2, 3, more} times more columns of type NUMBER than other types Table Relationships Table relationships can be used for determining join or lookup condition, sequencing, and table identification. Example table relationship features in accordance with various embodiments are:
- Table is self-referential
- Table has incoming foreign key constraints
- Table has outgoing foreign key constraints
- Table has {1, 2, more} outgoing foreign key constraints
- Table has {1, 2, more} incoming foreign key constraints
- Table T1 refers to table T2
- Table T1 is directly or indirectly connected to T2 through outgoing foreign kesy
- Table T1 is directly or indirectly connected to T2 through outgoing foreign keys with less than X indirect relationships.

In some situations, the intensions of a designer may not be apparent from the underlying schemas. Domain expertise may be useful for certain ETL rule/mapping making decisions. For example, it is often not clear which tables in a highly connected data model to include in a dataset. In some instances, for tables and columns, additional metadata can be added to the underlying database schema to enable the desired behavior. For example, 10 tables may be connected though foreign key constraints, but only a subset of them might be included in a source data set that have the same value of a "group1" attribute. In another example, schemas or tables may be assigned types. For example, a schema may be a star schema with facts, dimension, hierarchy or bridge tables. Below illustrate certain pieces of metadata that can be extracted during feature extraction:
- Metadata attribute X has value Y
- No Metadata attribute X defined
- Metadata attribute X value of table T1 is identical to metadata attribute X value of table T2
- Metadata attribute X value of table T1 is {smaller, larger} to metadata attribute X value of table T2
- Metadata attribute X has the same name as {source, target} {table, column} Y In some embodiments, metadata can provide information to machine learning component 110 and/or rules interpreter 114 that would otherwise not be readily communicated from other inputs (e.g., other structures of source schema 102, other structures of target schema 104, other extracted features, and example ETL mappings 108). Metadata can be represented as name-value pairs that are dependent on the particular domain-specific purpose. In some cases, the value may be a list/array of values.

Some implementations of an ETL Generator can include one or more of the following metadata:
- A "Source Table" can be used in a target table to identify one or multiple source tables. This can be used in situations to resolve ambiguities, such as mismatches due to improper naming conventions.
- A "Pattern Name" and "Pattern Participant" can be used for source and target tables to clarify the overall pattern that is used and which role each table plays (participant). For example, this can play a role similar to other design patterns common in ETL use cases.
- A "Group" in source and target tables can be used to define the scope of a structure. For example, in highly connected database schemas, it can be challenging to determine tables related through FK constraints that define a unit. In these cases, it is helpful to indicate a grouping.
- A "Filter Condition" in target schema table can be used to express conditions on source tables to define a subset of information. Such conditions are often driven by domain-specific details in the source systems. Providing such information allows the learning algorithm to include the condition into generated rules.

In some embodiments, it can be possible to implement default behavior for some standardized metadata elements for a target ETL system. The examples described above can be included in such generic elements. In some embodiments, metadata may be used in other ways that are specific to a source schema. In some embodiments, feature extraction 106 extracts a plurality of the above example features from source schema 102 and target schema 104.

In some embodiments, output ETL mappings 116 are related to the concept of automated schema mapping, or the mapping of source schema 102 to target schema 104. The techniques described in embodiments this disclosure achieve not just schema mapping but the procedures to extract data from source tables and to transform and load data into target tables, a process known as ETL or ELT. Schema mapping often occurs beforehand in order to successfully enable ETL solutions. In some implementations, it is sufficient to determine which source table column(s) is mapped to which target table column(s). In a simple case, matching source and target table columns use sufficiently similar names and define related data types.

Embodiments provide example ETL mappings 108 that map source schema 102 to target schema 104. Example ETL mappings 108 may be represented in any form that can be easily analyzed and are the basis for generating an ETL executable (e.g., output ETL mappings 116 configured to be executed for data migration). For example, an ETL extensible markup language ("XML") specification format used in various embodiments can be similar to the ETL XML specifications from the ETL tool Oracle Data Integrator ("ODI"). In some embodiments, the example XML ETL specifications can include multiple parts:
- Definition of Mappings
  - Name of mapping
  - Name of folder located in ETL software tool (e.g., logical file location)
  - Source tables and how to filter, lookup, and join sources. In various embodiments, sources may exist in source and targets schema.
  - Target table
  - Extraction (e.g. structured query language ("SQL") or database link) and insert strategies (e.g. incremental, merge, append) configured using parameters
  - Mapping expressions for each target column that may contain constants, 1-1 column mappings or expressions with one or multiple source columns
- Variables
  - Variable name
  - Variable type
  - Variable definition
- Sequences
  - Name of Sequence
  - Type of Sequence (e.g. DB Sequence)
  - Sequence definition
- Definition how to orchestrate ETL Mappings and other ETL primitives (a.k.a. package)
  - Package name
  - Name of folder located in ETL tool
  - Sequential or parallel execution of mappings
  - Initialization of variables
  - Execution of procedures In addition to the XML specifications, the source and target database models contains features to consider:

Name of source and target schemas
Table and column names
Type of columns
Not null, primary key and foreign key constraints
Unique indexes In some embodiments, variables can be artifacts of an ETL tool to maintain state (a number or string) that can be referenced in mappings and ETL orchestration definitions. In some embodiments, sequences can be part of an ETL definition, often defined in the database itself. For example, sequences can be provided as data definition language ("DDL") scripts for the database or may be separately generated.

In various embodiments, the extraction, transformation, and loading of data from a source schema to a target schema is structured as a set of sub-projects in which either one or a group of sources are extracted, transformed, and loaded into one or a group of target tables. For example, ETL design can include two mostly independent levels: determining which tables to map as part of a unit of work and designing the mapping expressions between source and target columns. A unit of work can include one or multiple mappings and a variety of other details for an ETL solution, such as procedures, sequence definitions, variable definitions, and the like. The following provides example table and column mappings for these two levels:

Table Mapping Design

Table-level ETL design considers which source and target tables participate in a unit of work. Some common patterns exist:

One to One Pattern: One source table is mapped to one target table.

Many to One Pattern: Multiple source tables are joined into one data set and mapped to one target table. This is a common scenario when loading data from operational systems into a data warehouse with a star schema. For example, multiple tables representing a dimension hierarchy are joined to produce a denormalized dimension table.

One to Many Pattern: One source table may map all or a subset of records to multiple target tables, which contain all or a subset of the source columns. This method can be used to separate unrelated table attributes into separate tables.

Type-Subtype Pattern: One source table is mapped to multiple target tables that separate common data into a type table and the specific details into one or multiple subtype tables. This is a special case of the One to Many pattern discussed above. The reverse is possible in which source tables with a type-subtype relationship are mapped to one target table.

Aggregate table pattern: An aggregate table is typically derived within the target schema from a table with finer-grain data using aggregation functions on measures and "group by" clauses to define the aggregation level.

Column Mapping Design

Column mapping has a number of common variations that are related to the type of columns, column type and names, and available source columns:

Columns that belong to the primary key of a table and may be copied from the source, created using a DB sequence, or copied from the parent table using a lookup operation (e.g., with left outer join).

Foreign key columns imply that a lookup is performed in the target schema (e.g., with left outer join) with the referenced table to retrieve the foreign key column based on one a natural key.

Columns may be simply copied 1-1 between source and target tables.

Columns may be mapped using simple expressions such as CAST to the type of the target column.

Certain system columns (e.g. data source ID, updated on date, or insert data) may be consistently named and will use the same expressions.

In some embodiments, mappings of one or multiple source tables to one target table are organized into units of work. In a simple case, one mapping is a unit of work that resides in a folder or package. In some implementations, a folder can be a concept of grouping related mappings, variable definitions, sequence definitions, or procedures. Similarly, a package can define in which sequence these related ETL elements are executed.

In some embodiments, a type-subtype pattern may be implemented as multiple mappings that map the source table into a type and one or multiple subtype tables. These mappings can create one unit of work that are located in a folder or package. In addition, the table structure may require that the target table containing the type information is loaded first and that all other tables are loaded afterwards, or possibly in parallel.

After machine learning component 110 is provided the extracted features and example ETL mappings 108, new ETL rules/mappings can be predicted for the extraction of data from source schema 102 and the loading of that data into target schema 104. In some embodiments, a solution framework can be defined with different modules to determine various aspects of the solution. For example, one or more of these modules can be designed to be flexible and configurable such that specific solutions can be defined for specific source/target schemas. In some examples, decisions can be expressed as rules and in some examples decisions are expressed as probabilities or weights.

Traditional ETL generators often hard-code these rules. Some generators allow ETL teams to write or configure rules manually to adapt the ETL generator framework for the particular situation. This approach has significant benefits over the traditional generator, however it still requires significant man hours. In contrast, in various embodiments, the ETL rules and configurations can be automatically (i.e., without human intervention) learned for different aspects of the ETL process using the provided example ETL mappings 108. The process of automatically generating ETL rules can be broken down into multiple components, and each component can involve decisions that can be learned. Embodiments can then provide output ETL rules 112 to rules interpreter 114 to arrive at output ETL mappings 116, which can be used to achieve the migration between schemas.

In some embodiments, machine learning component 110 can include multiple modules that may have aspects that are learned based on features extracted from source schema 102, target schema 104, and example ETL mappings 108. For example, learning can be accomplished using supervised learning algorithms that learn combinations of schema, table, and column features that determine aspects of the ETL solution that are observed from example ETL mappings 108.

In many respects, learning is not universal or generic. For example, the designer of an ETL solution (e.g., providing sample ETL mappings 108) can tailor the learning, based on the provided examples (and in some instances provided metadata), to fit the specific problem using one or multiple learning techniques.

In some embodiments, various preparation can be performed in advance of the learning of ETL rules. For example, tables can capture operation data such as the data source of a row, the date and time of initial load, the date and time of last update, the user ID of the person who update the record last, and the like. These columns are typically system columns that all or most tables possess. In some cases, groups of tables may define common columns, which is an indication of a shared design. Examples are type columns for type-subtype patterns, effective date and current flag columns for versions records, or generic LVL<n> columns that indicate hierarchies. Columns that are frequently used in the schema can be converted into additional features (e.g., "isCommonColumnType_x") that can be used during by learning machine learning component 110 to predict additional ETL rules.

In another example, deriving information about the structure of the schema as an additional feature can aid in learning. One classic difference is between operational schemas that are highly normalized and reporting schemas that are denormalized and organized in stars (e.g., snowflake vs. star schemas). This determination can be made typically with an algorithm that is able to determine if the schema consists of stars or not. An example algorithm that makes such a determination is provided in U.S. Patent Application Pub. Num. 2016/0078064, to Michael Sassin, entitled AUTOMATIC GENERATION OF LOGICAL DATABASE SCHEMAS FROM PHYSICAL DATABASE TABLES AND METADATA.

A related algorithm can classify star schema tables as facts, dimensions, hierarchies, bridge tables, lookup tables, and the like. In most cases, the algorithm can use foreign key constraints to make these determinations. Naming conventions and the occurrence of certain columns or data types in columns or the ratio between columns of type NUMBER and not number may also be learned.

In some embodiments, in order to perform this type of learning, a larger dataset of star schemas with pre-classified table types can be provided. Normalized schema tables may be classified as well using similar techniques. In some of implementations, the goal can be to identify model patterns or design archetypes. In other embodiments, this information can be provided as metadata or can otherwise be made available to learning components of the system.

In some embodiments, ETL mappings are generated as a unit of work. For example, previously disclosed are techniques for identifying tables based on the column mappings that are determined by schema mapping algorithms. In some embodiment, the unit of work defined by the schema mapping is based on the units of work defined by example ETL mappings 108.

In some embodiments, a unit of work for an ETL solution can be classified. Each unit of work may follow a solution pattern, previously disclosed, that provides a reusable solution to similar problems in a particular context. Multiple solution patterns are established for denormalizing data, mapping type-subtype patterns, and the like. A classification can be helpful as an additional, derived feature, as it can be a shortcut for more complex rules. In some embodiments, an algorithm is used to predict the pattern of a unit of work. Pattern names can be supplied as metadata to machine learning component 110.

In some embodiments, the learning algorithm can be implemented as a classification algorithm or a rule-learning algorithm. In some instances, learning by example can encounter challenges when attempting to learn complex decisions. Embodiments can also include a supervised implementation, where a user is prompted to provide input (e.g., a selection) based on the learning achieved. An example approach is further discussed in S. Bocionek and M. Sassin, *Dialog-Based Learning (DBL) for Adaptive Interface Agents and Programming-by-Demonstration Systems*, Technical Report CMU-CS-93-175, Carnegie Mellon University, July 1993.

When learning units of work, join conditions are often required to extract data sets, such as from a star schema or any other suitable schema. For example, tables can be joined using conditions that utilize the columns defined by foreign key constraints between tables. The join may be an inner or outer join depending on the NOT NULL constraint of the foreign key columns. In some embodiments, variations of this standard approach may be learned based on features of the participating tables (e.g., columns participating in join are of alternative keys, indexes or simply have a fixed name, and the like).

When learning units of work, mapping expressions are also learned between source schema 102 and target schema 104. Mapping expressions can fall into a number of broad categories, including:
  Mapping of primary key columns
  Mapping of foreign key columns
  Mapping of code columns
  system columns
  other columns In some embodiments, primary key columns are created using a surrogate key or by looking up a parent table (via a foreign key) to retrieve the existing primary key column. For example, target mapping expressions can be analyzed to make such determinations. A surrogate key value can be defined as a database sequence, which can be in the target mapping expression. If the natural key is used, the expression can define a primary key column of the source table in the target mapping expression.

In some embodiments, foreign key columns in source schema 102 are used to lookup values in a parent table in the source schema 102. Code columns are transformed in a similar fashion using lookup operations as foreign key columns. In these examples, a well-established set of lookup or creation patterns exist that are not learned but are provided by the ETL framework.

For example, related expressions can be defined by example ETL mappings 108. For example, a common pattern can be used when loading dimension tables into a star schema. The dimension tables can define a surrogate key as a primary key and provide a natural key originating from the source system as a lookup key. In some instances, the dimension table can serve as a lookup using the natural key to determine if the dimension row has already been loaded, in which case newly arriving data is considered a change record that triggers an update of the dimension. The specific details, such as columns and actions and/or sequences to load or update the dimensions, can differ based on implementations. For each instance of an ETL rule, participating columns in source and target tables can be identified and the rules associated with their selection can be learned.

For example, assume that table S is mapped to target table T, which has a foreign key relationship to parent table T2. In order to populate the foreign key columns in T, the source table S should have one or multiple natural key columns for the relationship that are also available in T2. In some embodiments, a learning algorithm can learn the conventions around the foreign column name using extracted features (e.g., extracted by feature extraction 106) for the columns used in example ETL mappings 108. In most cases, some level of regularity is used in naming conventions (e.g., the names use the name of the parent table and uses the same pre- or postfixes). In some cases where either the source or target tables do not follow conventions that can be expressed by features, column-level metadata can be added to supplement the schema.

In some embodiments, the lookup of coded values follows similar rules as the case for the foreign key lookups. A potential differences is that the mapped value and not the row's key column is retrieved. In other respects, the code column can follow a similar process as the key columns.

In some embodiments, system columns follow rules as well, such as copying a source value with a constant name, inserting functions (e.g. system time), constants (e.g. CURRENT_FLG is set to 'Y'), or a lookup to a table based on a provided identity (e.g. user ID for last updated user). These rules can be learned based example ETL mappings 108.

In some embodiments, other columns that do not fall into one of the above categories may exist. In many cases, these columns can be mapped 1-1 from the source column (e.g., data is simply passed through to the target column). Common variations are that source data is checked for NULL value and a default value is supplied or that a source column is truncated or cast to a different type. These rules can again be learned based on example ETL mappings 108.

In some implementations, some ETL rules/mappings can be complex, and thus may not conducive to an example based learning environment. In these instances, the complex rules/mappings may be skipped by the learning system, and a user may manually generate the rules/mappings to achieve ultimate ETL solution. In other words, some embodiments that include complex rules and/or mappings between a source schema and a target schema can rely on a mix of automated rules and mappings generation and manual rules and mappings generation.

A use case is considered that includes a source schema, a target schema, example ETL mappings, and learned ETL rules. For example, the Appendix includes SQL used to generate a source schema and a target schema (with parent and child schemas). An implementation of the source schema can be a data warehouse staging schema. An implementation of the target schema can be a 3NF enterprise data warehouse schema with change record.

Embodiments can implement ETL rules and/or mappings where a source table is used to load one or more target tables. Record versioning can be used to lookup foreign keys for the schemas using a natural key and version number. Metadata elements can be provided, including filter conditions. Common mapping expressions can be used for system columns for the source and target schemas. Some example ETL mappings include simple 1-1 column mappings.

In some implementations, the source and target schemas can include over 500 tables. Such an ETL project can take significant man power, time (e.g., years), and resources to perform manually. However, many mappings can be characterized by a small number of ETL patterns (e.g., 90% of mappings can be characterized by 2 or 3 ETL patterns). In some implementations, around 100 rules of low complexity can be learned by embodiments. In the considered use case, the source and target schemas follow defined naming conventions.

Components of the example ETL system include an ETL tool, an ETL specification, an ETL translator, an ETL generator, a rules interpreter (e.g., similar to rules interpreter 114 of FIG. 1), and a learning component (e.g., similar to learning component 110 of FIG. 1). In the given implementation, a rule can be a decision and condition with an associated expression. In some cases, a template or a part of a template can be linked to a rule.

Embodiments of the ETL tool can express ETL components and mappings. For example, the ETL tool can translate definitions into executables that run against the source and target systems. The Oracle® Data Integrator ("ODI") ETL tool can be an example used in some implementations. An implementation of the ETL specification can be a human-readable and machine-readable text format definition that specifies ETL solutions. In some embodiments, the ETL specification is mostly independent of the target ETL system. An example ETL specification includes the ETL specification used by the Oracle® Data Warehouse Factory ETL Translator ("DWF ETL").

FIG. 4 illustrates an example ETL specification according to an embodiment. Specification 400 can include definitions for one or more of: folder and artifact names; references to source and target tables; filters, joins, lookups, unions, and aggregations; target columns and expressions for them; additional instructions about how to extract and load data from/to tables; and the like. Specification 400 is defined in an XML format, though any other suitable format can be implemented (e.g., JavaScript Object Notation ("JSON"), YAML Ain't Markup Language ("YAML"), plain text, and the like).

Embodiments of the ETL translator can translate the ETL specification into definitions used by a target ETL tool. An example translator is implemented by DWF ETL to generate ODI definitions. Embodiments of the ETL generator can generate ETL specifications, typically from source and target table definitions. For example, generated ETL specifications can be based on derived metadata, features extracted from a source and/or target schema, and/or explicit metadata. In some implementations, an ETL specification can be provided, for example based on automated generation, manual generation, or a combination of these.

Embodiments of the learning component can define specific decisions in the context of the ETL framework (e.g., ETL specification, and other ETL configurations) and the ETL generator. As disclosed with reference to machine learning component 110 of FIG. 1, the learning component can generate ETL rules based on example ETL mappings. In this considered use case, the example ETL mappings can be expressed as ETL specification definitions and/or schema metadata. The learning can be specific to different rule(s)/mappings/groups of data of the schemas. In some embodiments, the learning component can be configured to implement multiple machine learning algorithms, each configured to perform a specific learning task (and make the specific machine predictions) for different rules/mappings/groups of data.

Embodiments include leveraging machine learning to generate a portion of schema mappings between the source and target schema. For example, based on the example ETL mappings provided to the learning component, a portion of mappings can be learned and predicted. In some implementations, the portion can be a large percentage of data from the source schema (e.g., 90% of tables/columns). Some implementations include leveraging manual mappings to generate a comprehensive set. In some embodiments, enough example ETL mappings can be provided to allow the learning component to generate a comprehensive set of mappings.

Figure 5:
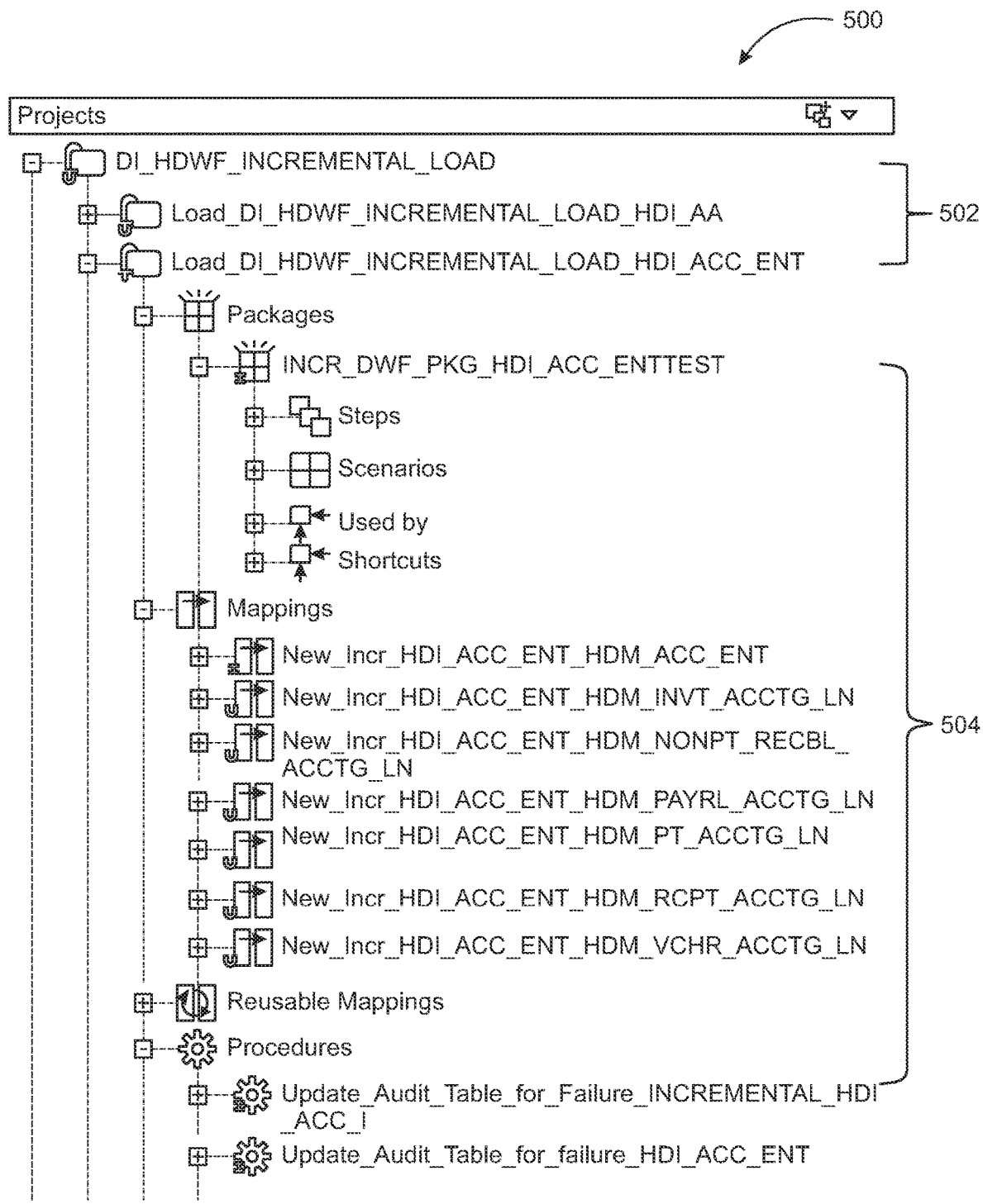
FIG. 5 illustrates a sample ETL structure implemented by an ETL tool according to an example embodiment.

Aspects of ETL learning performed by the learning component include details of an ETL solution. FIG. 5 illustrates a folder structure of an ETL tool (e.g., ODI) according to an embodiment. Structure 500 includes folders 502 that can be names of ODI folders and/or subfolders used in mappings and other ETL procedures. Embodiments of folder naming schemes can include constants (e.g., "LOAD_DI_HD-WF . . . ", as illustrated by elements of folders 502) and/or can contain names of source/target tables. Structure 500 can also include ETL elements 504, which can be packages, mappings, and procedures. These ETL elements 504 can also include names of source/target tables. Mappings can often be grouped based on source or target tables relevant to the mappings.

Figure 6:
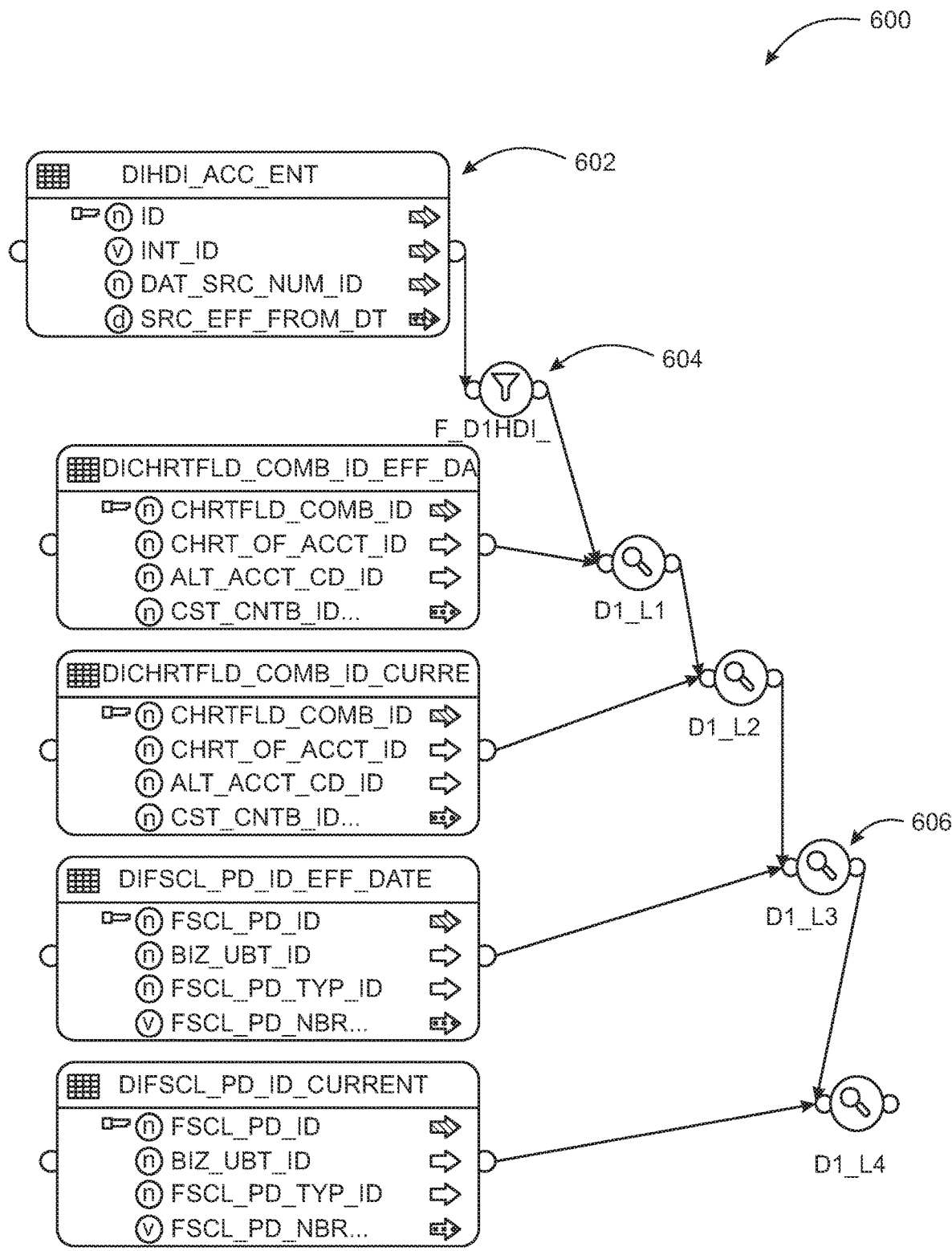
FIG. 6 illustrates sample schema mappings structures according to an example embodiment.

FIG. 6 illustrates a mapping structure according to an embodiment. For example, mapping structure 600 includes tables 602 that are used in a given mapping. These tables are often defined in "patterns" for the ETL. Tables can be referenced via foreign keys within the mapping structure. Filters 604 can be applied to tables 602, for example applied to the source tables. Example filter functionality can include rule/condition based row filtering and column filtering. Filters (e.g., rules/conditions for filters) can be supplied through metadata, or provided through other mechanisms. The filtering functionality can be a portion of a data manipulation and/or transformation stage in an ETL process flow. For example, filters 604 can represent data manipulation used in the relevant mapping to map source data from source data tables to target data tables.

Embodiments include performing joins to manipulate, transform, and/or filter data (e.g., source data). Joins can be performed using foreign key constraints. Lookups 606 can be references to the relevant target data tables in the mapping structure. Lookups 606 can similarly be defined based on foreign key constraints. Mapping structure 600 can represent a structure for mappings between a source schema and a target schema according to various embodiments.

FIG. 7 illustrates mapping expressions according to an embodiment. For example, structure 700 includes mappings expressions 702, 704, 706, and 708. Mappings expressions can map a source data (e.g., from a data table) to a target attribute and data table. In some instances, a source column can be mapped to a target column with a similar name, as illustrated by mapping expression 704. In some instances, a system function, such as sysdata, can be used in a mapping expression, as illustrated in mapping expression 708.

In some instances, variables can be used in a mapping expression, such as variables that capture strings that start with ":" or "#", as illustrated in mapping expression 702. In some instances, functions can be used to wrap a column, such as CAST, NVL, or some other custom function, as illustrated in mapping expression 706. Embodiments also include aggregation functions, such as SUM, AVG, Group By, and the like, within mapping expressions.

With reference to the considered use case and the source and target schemas disclosed in the Appendix, the implemented learning component can learn, based on the source schema, target schema, extracted features, and example mappings (further disclosed below), a number of trends in the data. System columns in tables can be used systematically in source and target tables. For example, data records can be added, updated, or deleted, users can be created and updated, flag functionality can be consistent, and the like.

Embodiments of the learning component can learn expressions for columns with the same name that occur in significant numbers of source and/or target tables. In some circumstances, column mappings can define one or a few variations per column name (e.g., based on type). The learning component can specifically determine the criteria for this variation.

Embodiments can include selecting data to train the learning component. For example, selecting mappings to a same target column across example ETL mappings can improve learning outcomes for some implementations. Decisions on column mappings can be performed based on metadata directly related to participating columns, where the metadata can be extended, in certain circumstances, to include metadata for columns' tables, for example to include information such as names or pattern types. Example column metadata for the considered use case includes names, features related to the names such as prefixes or postfixes, column data types, additionally added metadata elements, and the like.

Figure 8:
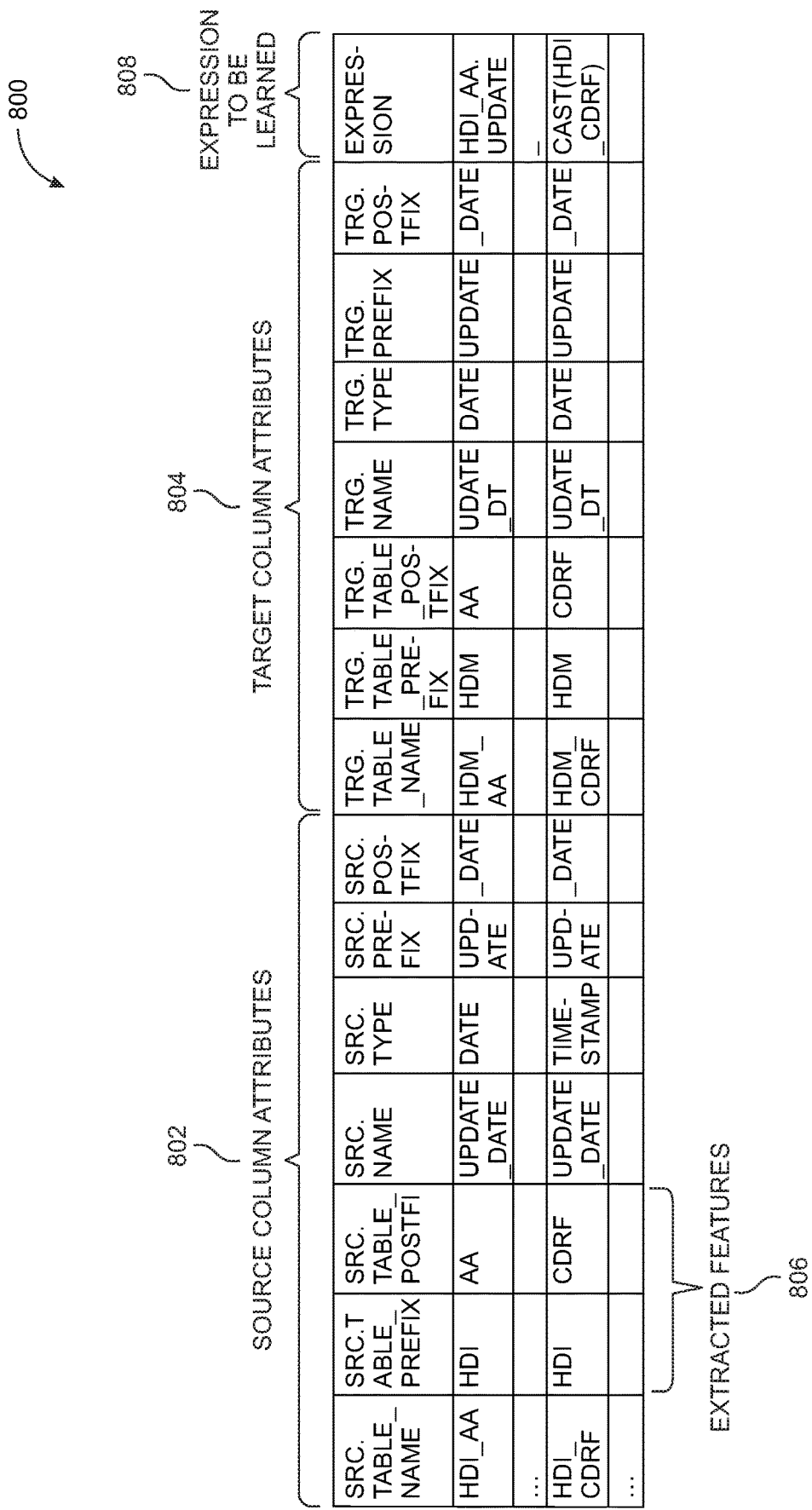
FIG. 8 illustrates a sample attribute vector according to an example embodiment.

FIG. 8 illustrates a sample attribute vector according to an example embodiment. For example, attribute vector 800 can include source schema, target schema, and extracted features data relevant to the considered use case. Columns 802 depict source column attributes while columns 804 depict column target attributes. Features 806 depict extracted features from the source schema, such as a pre-fix and a post-fix for the relevant column names. Mapping expressions 808 depict the mapping expression to be learned, for example by the learning component.

In an embodiment, a plurality of example mapping expressions can be provided to the learning component in the use case. The example mapping expression "trg.update_date=src.update" has 5 occurrences in the use case data (e.g., source schema and target schema from the Appendix). In addition, the example mapping expression "trg.update_date=CAST(src.update, DATE) has 4 occurrences in the use case data. The source columns update_date use a type Date in the first set of example mappings and a type Timestamp in the second set of example mappings. Accordingly, a CAST function is used in the mapping expressions for the second set of examples. In the illustrated use case, a goal of the learning component can be to learn to when similar mapping expressions apply and to pick one of these mapping expressions (e.g., CAST or not) in the appropriate circumstance.

Embodiments of the learning component can implement a ID3 decision tree learning algorithm, or any other suitable learning algorithm, to achieve the desired learning/predicting. For example, the learning component can learn the logic:
   if exist(src.update_date) & type(src.update_date)='Timestamp' &
   exist(trg.upate_dt)
   then trg.update=CAST(src.upate_date, DATE)
   else trg.update_dt=src.upate_date end In the example use case, embodiments of the learning component can learn/predict a mapping for system column trg.update_dt. This learning/predicting can be based on the similar example mappings provided to the learning component (e.g., mapping expressions for "trg.update" and "srcupdate" above). In addition, in the use case, embodiments can learn/predict the logic to determine when to select the mapping expression with the "CAST" function and when to select the other mapping expression. The logic for the learned mapping expression is similar to the logic in the example mappings expressions provided, namely a CAST is used when the data type is Timestamp. Similarly, other use cases can provide other example mapping expressions that illustrate patterns between the source schema and the target schema, where the learning component can learn when and how to apply similar mapping expressions to other aspects of data to predict ETL rules.

Considering the use case, the learned ETL rules can be interpreted by the rules interpreter. For example, the rules interpreter can interpret the above learned logic and, based on the source schema, target schema, and extracted features, generate ETL mappings according to the rule (and the represented logic). In particular, ETL mappings can be generated for the trg.update_dt column. The generated mappings can then be used in an ETL solution, and ultimately can be used to achieve a data migration from the source schema to the target schema.

While traditional ETL is considered in embodiments, stream processing ETL can also be implemented. For example, Apache Kafka can be included in various implementations, where message streams can be consumed by various stream processing frameworks, such as Kafka Streams Application Programming Interface ("API"), Apache Storm, Apache Spark, Apache Samza, and the like. In some embodiments, rather than batch processing, stream processing can be implemented to achieve various solutions disclosed.

Figure 9:
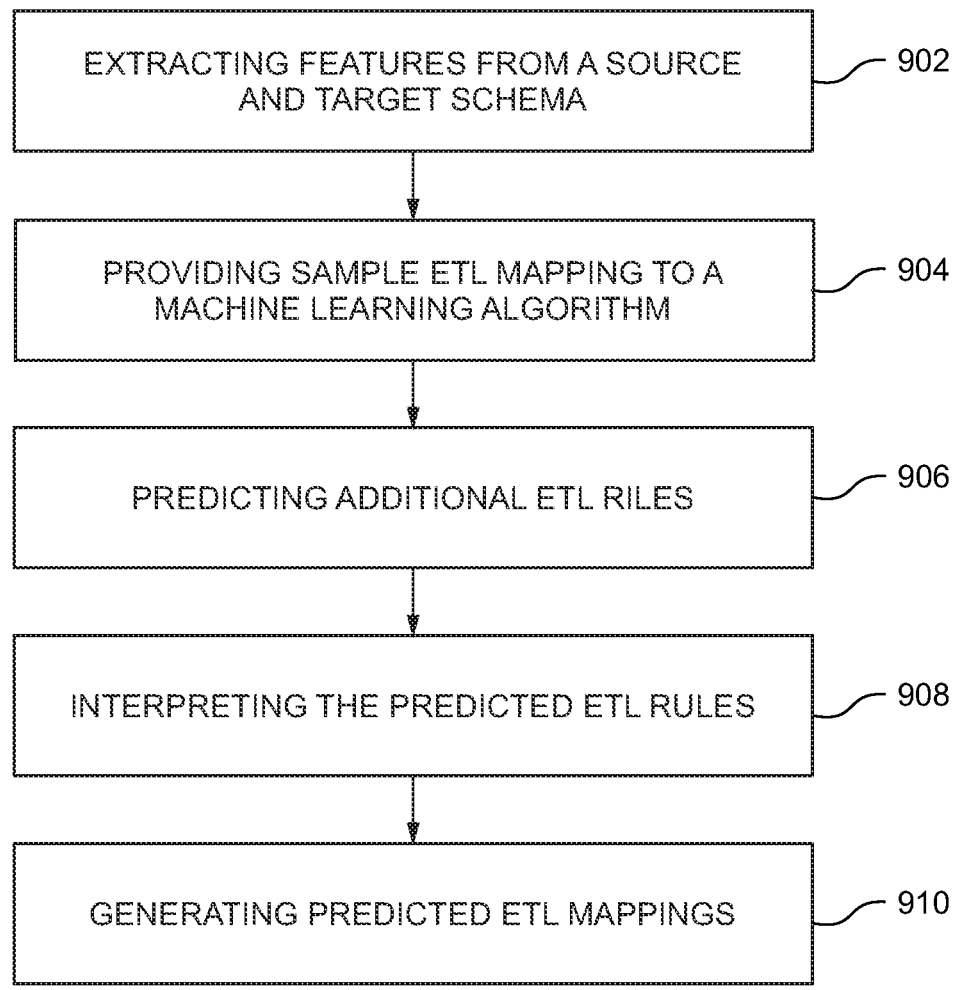
FIG. 9 illustrates an example method for learning extract, transform, and load mappings by example according to an example embodiment according to an example embodiment.

FIG. 9 illustrates an example functionality for learning extract, transform, and load rules by example according to an example embodiment. In one embodiment, the functionality of FIG. 9 below is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 902, a plurality of features can be extracted from a source schema and a target schema, the features including at least columns of a plurality of tables of the source schema and the target schema. In some embodiments, the features can further include identifiers for columns, metadata for columns, foreign keys for tables, and other suitable features. In some examples, the metadata for a column in a source schema can indicate relationships between that column and other columns/tables of the source schema, or can indicate other suitable data relationships.

At 904, example ETL mappings can be provided to a machine learning algorithm, wherein the example ETL mappings are definitions for extracting data from one or more tables of the source schema and loading the extracted data into one or more tables of the target schema. The example ETL mappings can be mapping expressions that define a relationship between one or more source columns of a source table and a target column of a target table.

In some embodiments, the example ETL mappings can include a mapping expression that implements at least one of a column name post-fix or a column name pre-fix. In some embodiments, the example ETL mappings can include a mapping expression that implements one or more functions applied to a source column of the mapping expression.

At 906, using the machine learning algorithm and based on the source schema, target schema, and extracted features, one or more ETL rules can be predicted that define logic for extracting data from the source schema and loading the extracted data into the target schema. In some embodiments, the predicted ETL rules can define logic represented by the example ETL mappings.

In an embodiment, the example ETL mappings represent relationships between the source schema and a first set of columns of the target schema. The predicted ETL rules can define logic for relationships between the source schema and a second set of columns of the target schema, where the second set of columns is different from the first set of columns.

At 908, the predicted ETL rules can be interpreted. For example, a rules interpreter can interpret the logic defined in the ETL rules to generate mapping expressions between the source schema and target schema. The interpretation can be based on the source schema, target schema, and extracted features. In some embodiments, an ETL specification is implemented that defines details of the ETL solution, and the interpretation can be based on the ETL specification.

At 908, additional ETL mappings can be generated based on the predicted ETL rules, the source schema, the target schema, and the extracted features, the additional ETL mappings providing additional definitions for extracting data from one or more tables of the source schema and loading the extracted data into one or more tables of the target schema. For example, the rules interpreter can be used to generate the additional ETL mappings. In some embodiments, the additional ETL mappings can be mapping expressions that define a relationship between one or more source columns of a source table and a target column of a target table.

In an embodiment, the example ETL mappings can include a mapping expression that implements a first type of function applied to a column of the source schema for loading a first column of the target schema. The additional ETL mappings can include a mapping expression that implements the first type of function applied to the column of the source schema for loading a second column of the target schema.

Embodiments learn extract, transform, and load mappings by example. The relationship between a source schema and a target schema can often be complex, thus making machine learning applications for ETL non-trivial. Embodiments leverage feature extraction for a source data schema and target data schema that provide granular level data points to the machine learning algorithms that enables improved learning. Further, example mappings between the source and target data schemas are provided to the machine learning algorithms that are defined according to a ETL framework. As a result, the machine learning algorithms can extrapolate trends based on the relationships illustrated between the target schema and source schema in the examples. These extrapolated trends can be defined at a detailed level that is conducive to machine prediction because they are defined at a granular level that is specific to the schemas. Subsequently, the machine learning algorithm can predict new ETL rules that can be used to accomplish the migration of data from the source to the target. A rules interpreter can then be leveraged to generate ETL mappings based on the precited new ETL rules.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

APPENDIX

```
SOURCE TABLE:
CREATE TABLE "OHF711_HDI"."HDI_ENC"
   ( "ID" NUMBER(38,0) NOT NULL ENABLE,
     "INT_ID" VARCHAR2(400 BYTE) NOT NULL ENABLE,
     "DAT_SRC_NUM_ID" NUMBER(10,0) NOT NULL ENABLE,
     "SRC_EFF_FROM_DT" DATE,
     "SRC_EFF_TO_DT" DATE,
     "PT_INT_ID" VARCHAR2(400 BYTE),
     "PT_DAT_SRC_NUM_ID" NUMBER(10,0),
     "PT_SRC_CHANGED_ON_DT" DATE,
     "SUBTYP_CD" VARCHAR2(80 BYTE),
     "SUBTYP_CDG_SYS" VARCHAR2(80 BYTE),
     "SUBTYP_CDG_SYS_VER" VARCHAR2(80 BYTE),
     "ENC_STUS_CD" VARCHAR2(80 BYTE),
     "ENC_STUS_CDG_SYS" VARCHAR2(80 BYTE),
     "ENC_STUS_CDG_SYS_VER" VARCHAR2(80 BYTE),
     "CD" VARCHAR2(80 BYTE),
     "CDG_SYS" VARCHAR2(80 BYTE),
     "CDG_SYS_VER" VARCHAR2(80 BYTE),
     "ADMSN_TYP_CD" VARCHAR2(80 BYTE),
     "ADMSN_TYP_CDG_SYS" VARCHAR2(80 BYTE),
     "ADMSN_TYP_CDG_SYS_VER" VARCHAR2(80 BYTE),
     "ADMSN_STUS_CD" VARCHAR2(80 BYTE),
     "ADMSN_STUS_CDG_SYS" VARCHAR2(80 BYTE),
     "ADMSN_STUS_CDG_SYS_VER" VARCHAR2(80 BYTE),
     "PT_DC_STUS_CD" VARCHAR2(80 BYTE),
     "PT_DC_STUS_CDG_SYS" VARCHAR2(80 BYTE),
     "PT_DC_STUS_CDG_SYS_VER" VARCHAR2(80 BYTE),
     "PT_MD_CD" VARCHAR2(80 BYTE),
     "PT_MD_CDG_SYS" VARCHAR2(80 BYTE),
     "PT_MD_CDG_SYS_VER" VARCHAR2(80 BYTE),
     "CNFDLTY_CD" VARCHAR2(80 BYTE),
     "CNFDLTY_CDG_SYS" VARCHAR2(80 BYTE),
     "CNFDLTY_CDG_SYS_VER" VARCHAR2(80 BYTE),
     "DX_RELTD_GRP_CD" VARCHAR2(80 BYTE),
     "DX_RELTD_GRP_CDG_SYS" VARCHAR2(80 BYTE),
     "DX_RELTD_GRP_CDG_SYS_VER" VARCHAR2(80 BYTE),
     "SRC_OF_ADMSN_CD" VARCHAR2(80 BYTE),
     "SRC_OF_ADMSN_CDG_SYS" VARCHAR2(80 BYTE),
     "SRC_OF_ADMSN_CDG_SYS_VER" VARCHAR2(80 BYTE),
     "MD_OF_ARRV_CD" VARCHAR2(80 BYTE),
     "MD_OF_ARRV_CDG_SYS" VARCHAR2(80 BYTE),
     "MD_OF_ARRV_CDG_SYS_VER" VARCHAR2(80 BYTE),
     "ENC_NBR" VARCHAR2(80 BYTE),
     "STRT_DT" DATE,
     "END_DT" DATE,
     "ESTD_LEN_OF_STY" NUMBER(10,0),
     "ESTD_LEN_OF_STY_UOM_CD" VARCHAR2(80 BYTE),
     "ESTD_LEN_OF_STY_UOM_CDG_SYS" VARCHAR2(80 BYTE),
     "ESTD_LEN_OF_STY_UOM_CD_SY_VR" VARCHAR2(80 BYTE),
     "ACTL_LEN_OF_STY" NUMBER(22,7),
     "ACTL_LEN_OF_STY_UOM_CD" VARCHAR2(80 BYTE),
     "ACTL_LEN_OF_STY_UOM_CDG_SYS" VARCHAR2(80 BYTE),
     "ACTL_LEN_OF_STY_UOM_CD_SY_VR" VARCHAR2(80 BYTE),
     "LV_OF_ABSNC" NUMBER(22,7),
     "LV_OF_ABSNC_UOM_CD" VARCHAR2(80 BYTE),
     "LV_OF_ABSNC_UOM_CDG_SYS" VARCHAR2(80 BYTE),
     "LV_OF_ABSNC_UOM_CDG_SYS_VER" VARCHAR2(80 BYTE),
     "READM_FLG" CHAR(1 BYTE),
     "PREADMT_NBR" VARCHAR2(80 BYTE),
```

-continued

```
     "NT" VARCHAR2(4000 BYTE),
     "RCRRNG_VST_FLG" CHAR(1 BYTE),
     "EBC_INT_ID" VARCHAR2(400 BYTE),
     "EBC_DAT_SRC_NUM_ID" NUMBER(10,0),
     "EBC_SRC_CHANGED_ON_DT" DATE,
     "ENC_ARRV_DT" DATE,
     "PT_ACCT_INT_ID" VARCHAR2(400 BYTE),
     "PT_ACCT_DAT_SRC_NUM_ID" NUMBER(10,0),
     "PT_ACCT_SRC_CHANGED_ON_DT" DATE,
     "ENC_SCHD_DT" DATE,
     "ENC_OCCURRED_DT" DATE,
     "ENC_CANCELLED_DT" DATE,
     "ENC_RSCHD_D_DT" DATE,
     "CHECKSUM" VARCHAR2(2000 BYTE),
     "CREATED_BY_USER_ID" VARCHAR2(400 BYTE),
     "CREATED_BY_USER_DS_NUM_ID" NUMBER(10,0),
     "CHANGED_BY_USER_ID" VARCHAR2(400 BYTE),
     "CHANGED_BY_USER_DS_NUM_ID" NUMBER(10,0),
     "SRC_CREATED_ON_DT" DATE,
     "SRC_CHANGED_ON_DT" DATE_NOT_NULL_ENABLE,
     "INCORRECT_FLG" CHAR(1 BYTE),
     "INSERT_DT" DATE,
     "REQUEST_ID" NUMBER(10,0),
     "TENANT_ID" VARCHAR2(80 BYTE),
     "DELETE_FLG" CHAR(1 BYTE),
     "SRC_FILE_ID" NUMBER(10,0),
     "ATTRIBUTE1" VARCHAR2(200 BYTE),
     "ATTRIBUTE2" VARCHAR2(200 BYTE),
     "ATTRIBUTE3" VARCHAR2(200 BYTE),
     "ATTRIBUTE4" VARCHAR2(200 BYTE),
     "ATTRIBUTE5" VARCHAR2(200 BYTE),
     "ATTRIBUTE6" VARCHAR2(200 BYTE),
     "ATTRIBUTE7" VARCHAR2(200 BYTE),
     "ATTRIBUTE8" VARCHAR2(200 BYTE),
     "ATTRIBUTE9" VARCHAR2(200 BYTE),
     "ATTRIBUTE10" VARCHAR2(200 BYTE),
     "ATTRIBUTE11" VARCHAR2(200 BYTE),
     "ATTRIBUTE12" VARCHAR2(200 BYTE),
     "ATTRIBUTE13" VARCHAR2(200 BYTE),
     "ATTRIBUTE14" VARCHAR2(200 BYTE),
     "ATTRIBUTE15" VARCHAR2(200 BYTE),
     "ATTRIBUTE16" NUMBER(22,7),
     "ATTRIBUTE17" NUMBER(22,7),
     "ATTRIBUTE18" NUMBER(22,7),
     "ATTRIBUTE19" DATE,
     "ATTRIBUTE20" DATE,
     "RECRD_SET_ID" NUMBER(10,0),
     "ATTRIBUTE1_CD" VARCHAR2(80 BYTE),
     "ATTRIBUTE1_CDG_SYS" VARCHAR2(80 BYTE),
     "ATTRIBUTE1_CDG_SYS_VER" VARCHAR2(80 BYTE),
     "ATTRIBUTE2_CD" VARCHAR2(80 BYTE),
     "ATTRIBUTE2_CDG_SYS" VARCHAR2(80 BYTE),
     "ATTRIBUTE2_CDG_SYS_VER" VARCHAR2(80 BYTE),
     "ATTRIBUTE3_CD" VARCHAR2(80 BYTE),
     "ATTRIBUTE3_CDG_SYS" VARCHAR2(80 BYTE),
     "ATTRIBUTE3_CDG_SYS_VER" VARCHAR2(80 BYTE),
     "ATTRIBUTE4_CD" VARCHAR2(80 BYTE),
     "ATTRIBUTE4_CDG_SYS" VARCHAR2(80 BYTE),
     "ATTRIBUTE4_CDG_SYS_VER" VARCHAR2(80 BYTE),
     "ATTRIBUTE5_CD" VARCHAR2(80 BYTE),
     "ATTRIBUTE5_CDG_SYS" VARCHAR2(80 BYTE),
     "ATTRIBUTE5_CDG_SYS_VER" VARCHAR2(80 BYTE),
     "CORRECTION_FLG" CHAR(1 BYTE),
     "ENC_RSN_NT1" VARCHAR2(4000 BYTE),
     "ENC_RSN_NT2" VARCHAR2(4000 BYTE),
     "ENC_RSN_NT3" VARCHAR2(4000 BYTE),
     "ENC_RSN_SUBTYP1_CD" VARCHAR2(80 BYTE),
     "ENC_RSN_SUBTYP1_CDG_SYS" VARCHAR2(80 BYTE),
     "ENC_RSN_SUBTYP1_CDG_SYS_VER" VARCHAR2(80 BYTE),
     "ENC_RSN_SUBTYP2_CD" VARCHAR2(80 BYTE),
     "ENC_RSN_SUBTYP2_CDG_SYS" VARCHAR2(80 BYTE),
     "ENC_RSN_SUBTYP2_CDG_SYS_VER" VARCHAR2(80 BYTE),
     "ENC_RSN_SUBTYP3_CD" VARCHAR2(80 BYTE),
     "ENC_RSN_SUBTYP3_CDG_SYS" VARCHAR2(80 BYTE),
     "ENC_RSN_SUBTYP3_CDG_SYS_VER" VARCHAR2(80 BYTE),
     "ENC_RSN1_CD" VARCHAR2(80 BYTE),
     "ENC_RSN1_CDG_SYS" VARCHAR2(80 BYTE),
     "ENC_RSN1_CDG_SYS_VER" VARCHAR2(80 BYTE),
     "ENC_RSN2_CD" VARCHAR2(80 BYTE),
```

```
"ENC_RSN2_CDG_SYS" VARCHAR2(80 BYTE),
"ENC_RSN2_CDG_SYS_VER" VARCHAR2(80 BYTE),
"ENC_RSN3_CD" VARCHAR2(80 BYTE),
"ENC_RSN3_CDG_SYS" VARCHAR2(80 BYTE),
"ENC_RSN3_CDG_SYS_VER" VARCHAR2(80 BYTE),
"ENTERPRISE_ID" NUMBER,
"SPECL_CRTSY1_CD" VARCHAR2(80 BYTE),
"SPECL_CRTSY1_CDG_SYS" VARCHAR2(80 BYTE),
"SPECL_CRTSY1_CDG_SYS_VER" VARCHAR2(80 BYTE),
"SPECL_CRTSY2_CD" VARCHAR2(80 BYTE),
"SPECL_CRTSY2_CDG_SYS" VARCHAR2(80 BYTE),
"SPECL_CRTSY2_CDG_SYS_VER" VARCHAR2(80 BYTE),
"SPECL_CRTSY3_CD" VARCHAR2(80 BYTE),
"SPECL_CRTSY3_CDG_SYS" VARCHAR2(80 BYTE),
"SPECL_CRTSY3_CDG_SYS_VER" VARCHAR2(80 BYTE),
"SPECLARNGMNT1_CD" VARCHAR2(80 BYTE),
"SPECLARNGMNT1_CDG_SYS" VARCHAR2(80 BYTE),
"SPECLARNGMNT1_CDG_SYS_VER" VARCHAR2(80 BYTE),
"SPECLARNGMNT2_CD" VARCHAR2(80 BYTE),
"SPECLARNGMNT2_CDG_SYS" VARCHAR2(80 BYTE),
"SPECLARNGMNT2_CDG_SYS_VER" VARCHAR2(80 BYTE),
"SPECLARNGMNT3_CD" VARCHAR2(80 BYTE),
"SPECLARNGMNT3_CDG_SYS" VARCHAR2(80 BYTE),
"SPECLARNGMNT3_CDG_SYS_VER" VARCHAR2(80 BYTE),
"SPECLARNGMNT4_CD" VARCHAR2(80 BYTE),
"SPECLARNGMNT4_CDG_SYS" VARCHAR2(80 BYTE),
"SPECLARNGMNT4_CDG_SYS_VER" VARCHAR2(80 BYTE),
"SPECLARNGMNT5_CD" VARCHAR2(80 BYTE),
"SPECLARNGMNT5_CDG_SYS" VARCHAR2(80 BYTE),
"SPECLARNGMNT5_CDG_SYS_VER" VARCHAR2(80 BYTE),
"REFAL_RSN_CD" VARCHAR2(80 BYTE),
"REFAL_RSN_CDG_SYS" VARCHAR2(80 BYTE),
"REFAL_RSN_CDG_SYS_VER" VARCHAR2(80 BYTE),
"PLND_DC_DT" DATE,
"HMN_SUBJ_INT_ID" VARCHAR2(400 BYTE),
"HMN_SUBJ_DAT_SRC_NUM_ID" NUMBER(10,0),
"HMN_SUBJ_SRC_CHANGED_ON_DT" DATE,
"SRC_SURGT_KY" VARCHAR2(400 BYTE),
"SRC_BIZ_KY" VARCHAR2(400 BYTE),
"MSTR_KY_ROOT_ID" VARCHAR2(400 BYTE),
"MSTR_KY_EXTN_TXT" VARCHAR2(400 BYTE),
"RSPNSBL_SVCPRV_INT_ID" VARCHAR2(400 BYTE),
"RSPNSBL_SVCPRV_DAT_SRC_NUM_ID" NUMBER(10,0),
"RSPNSBL_SVCPRV_SRC_CH_ON_DT" DATE)

TARGET_TABLE - PARENT:
CREATE TABLE "OHF711_HDM"."HDM_ACC_ENT"
 ( "ACC_ENT_ID" NUMBER(38,0) NOT NULL ENABLE,
   "CHRTFLD_COMB_ID" NUMBER(38,0) NOT NULL ENABLE,
   "FSCL_PD_ID" NUMBER(38,0) NOT NULL ENABLE,
   "GOV_ORG_ID" NUMBER(38,0),
   "ACC_ENT_LN_SUBTYP_ID" NUMBER(38,0) NOT NULL ENABLE,
   "ACC_ENT_LN_TYP_ID" NUMBER(38,0),
   "ACC_ENT_STCD_ID" NUMBER(38,0),
   "CURR_CD_ID" NUMBER(38,0),
   "ACC_ENT_ADDED_DT" DATE,
   "ACCTG_DT" DATE,
   "ACC_ENT_AMT" NUMBER(22,7),
   "STAT_AMT" NUMBER(22,7),
   "STAT_AMT_UOMCD_ID" NUMBER(38,0),
   "FRGHT_AMT" NUMBER(22,7),
   "DSCNT_AMT" NUMBER(22,7),
   "MISC_AMT" NUMBER(22,7),
   "EXCS_RCVRY_AMT" NUMBER(22,7),
   "EXCS_NON_RCVRD_AMT" NUMBER(22,7),
   "ACC_ENT_LN_QTY" NUMBER(22,7),
   "ACC_ENT_LN_QTY_UOMCD_ID" NUMBER(38,0),
   "ORIG_ACC_ENT_LN_SUBTYP_ID" NUMBER(38,0),
   "ORIG_ACC_ENT_LN_TYP_ID" NUMBER(38,0),
   "ORIG_ACC_ENT_STCD_ID" NUMBER(38,0),
   "ORIG_CURR_CD_ID" NUMBER(38,0),
   "ORIG_STAT_AMT_UOMCD_ID" NUMBER(38,0),
   "ORIG_ACC_ENT_LN_QTY_UOMCD_ID" NUMBER(38,0),
   "CREATED_BY_ID" NUMBER(38,0),
   "CHANGED_BY_ID" NUMBER(38,0),
   "CREATED_ON_DT" DATE,
   "CHANGED_ON_DT" DATE,
   "INSERT_DT" DATE NOT NULL ENABLE,
   "UPDATE_DT" DATE NOT NULL ENABLE,
   "REQUEST_ID" NUMBER(10,0),
   "SRC_EFF_FROM_DT" DATE,
   "SRC_EFF_TO_DT" DATE,
   "EFFECTIVE_FROM_DT" DATE NOT NULL ENABLE,
   "EFFECTIVE_TO_DT" DATE NOT NULL ENABLE,
   "CURRENT_FLG" CHAR(1 BYTE),
   "INCORRECT_FLG" CHAR(1 BYTE),
   "DATASOURCE_NUM_ID" NUMBER(10,0) NOT NULL ENABLE,
   "INTEGRATION_ID" VARCHAR2(400 BYTE) NOT NULL ENABLE,
   "TENANT_ID" VARCHAR2(80 BYTE),
   "DELETE_FLG" CHAR(1 BYTE),
   "UDA1" VARCHAR2(200 BYTE),
   "UDA2" VARCHAR2(200 BYTE),
   "UDA3" VARCHAR2(200 BYTE),
   "UDA4" VARCHAR2(200 BYTE),
   "UDA5" VARCHAR2(200 BYTE),
   "UDA6" VARCHAR2(200 BYTE),
   "UDA7" VARCHAR2(200 BYTE),
   "UDA8" VARCHAR2(200 BYTE),
   "UDA9" VARCHAR2(200 BYTE),
   "UDA10" VARCHAR2(200 BYTE),
   "UDA11" VARCHAR2(200 BYTE),
   "UDA12" VARCHAR2(200 BYTE),
   "UDA13" VARCHAR2(200 BYTE),
   "UDA14" VARCHAR2(200 BYTE),
   "UDA15" VARCHAR2(200 BYTE),
   "UDA16" NUMBER(22,7),
   "UDA17" NUMBER(22,7),
   "UDA18" NUMBER(22,7),
   "UDA19" DATE,
   "UDA20" DATE,
   "ACC_ENT_VN" NUMBER(10,0),
   "CHRTFLD_COMB_VN" NUMBER(10,0) NOT NULL ENABLE,
   "FSCL_PD_VN" NUMBER(10,0) NOT NULL ENABLE,
   "GOV_ORG_VN" NUMBER(10,0),
   "ORGNTNG_SRC_APP_NM" VARCHAR2(80 BYTE),
   "ORIG_STAT_AMT_UOMCD_VN" NUMBER(10,0),
   "ACC_ENT_LN_TYP_VN" NUMBER(10,0),
   "ORIG_ACC_ENT_LN_QTY_UOMCD_VN" NUMBER(10,0),
   "ORIG_CURR_CD_VN" NUMBER(10,0),
   "ACC_ENT_LN_SUBTYP_VN" NUMBER(10,0) NOT NULL ENABLE,
   "ORIG_ACC_ENT_LN_TYP_VN" NUMBER(10,0),
   "ACC_ENT_LN_QTY_UOMCD_VN" NUMBER(10,0),
   "STAT_AMT_UOMCD_VN" NUMBER(10,0),
   "CURR_CD_VN" NUMBER(10,0),
   "ORIG_ACC_ENT_LN_SUBTYP_VN" NUMBER(10,0),
   "ORIG_ACC_ENT_STCD_VN" NUMBER(10,0),
   "ACC_ENT_STCD_VN" NUMBER(10,0),
   "RECRD_SET_ID" NUMBER(10,0),
   "ENTERPRISE_ID" NUMBER,
   "CORRECTION_FLG" CHAR(1 BYTE),
   "UDA1_CD_ID" NUMBER(38,0),
   "UDA1_CD_VN" NUMBER(10,0),
   "UDA2_CD_ID" NUMBER(38,0),
   "UDA2_CD_VN" NUMBER(10,0),
   "UDA3_CD_ID" NUMBER(38,0),
   "UDA3_CD_VN" NUMBER(10,0),
   "UDA4_CD_ID" NUMBER(38,0),
   "UDA4_CD_VN" NUMBER(10,0),
   "UDA5_CD_ID" NUMBER(38,0),
   "UDA5_CD_VN" NUMBER(10,0),
   "ORIG_UDA1_CD_ID" NUMBER(38,0),
   "ORIG_UDA1_CD_VN" NUMBER(10,0),
   "ORIG_UDA2_CD_ID" NUMBER(38,0),
   "ORIG_UDA2_CD_VN" NUMBER(10,0),
   "ORIG_UDA3_CD_ID" NUMBER(38,0),
   "ORIG_UDA3_CD_VN" NUMBER(10,0),
   "ORIG_UDA4_CD_ID" NUMBER(38,0),
   "ORIG_UDA4_CD_VN" NUMBER(10,0),
   "ORIG_UDA5_CD_ID" NUMBER(38,0),
   "ORIG_UDA5_CD_VN" NUMBER(10,0),
   "SRC_SURGT_KY" VARCHAR2(400 BYTE),
```

```
    "SRC_BIZ_KY" VARCHAR2(400 BYTE),
    "MSTR_KY_ROOT_ID" VARCHAR2(400 BYTE),
    "MSTR_KY_EXTN_TXT" VARCHAR2(400 BYTE),
    CONSTRAINT_" HDM_ACC_ENT_PK" PRIMARY KEY
("ACC_
ENT_ID", "ACC_ENT_VN")_)
```

```
TARGET_TABLE-CHILD:
CREATE_TABLE_"TARGET"."HDM_INVT_ACCTG_LN"
   ( "ACC_ENT_ID" NUMBER(38,0)_NOT_NULL_ENABLE,
     "INVT_TRANS_ID" NUMBER(38,0)_NOT_NULL_ENABLE,
     "CREATED_BY_ID" NUMBER(38,0),
     "CHANGED_BY_ID" NUMBER(38,0),
     "CREATED_ON_DT" DATE,
     "CHANGED_ON_DT" DATE,
     "INSERT_DT" DATE_NOT_NULL_ENABLE,
     "UPDATE_DT" DATE_NOT_NULL_ENABLE,
     "REQUEST_ID" NUMBER(10,0),
     "SRC_EFF_FROM_DT" DATE,
     "SRC_EFF_TO_DT" DATE,
     "EFFECTIVE_FROM_DT" DATE_NOT_NULL_ENABLE,
     "EFFECTIVE_TO_DT" DATE_NOT_NULL_ENABLE,
     "CURRENT_FLG" CHAR(1 BYTE),
     "INCORRECT_FLG" CHAR(1 BYTE),
     " DATASOURCE_NUM_ID" NUMBER(10,0)_NOT_NULL_ENABLE,
     "INTEGRATION_ID" VARCHAR2(400 BYTE)_NOT_NULL_ENABLE,
     "TENANT_ID" VARCHAR2(80 BYTE),
     " DELETE_FLG" CHAR(1 BYTE),
     "ACC_ENT_VN" NUMBER(10,0)_NOT_NULL_ENABLE,
     "INVT_TRANS_VN" NUMBER(10,0)_NOT_NULL_ENABLE,
     "RECRD_SET_ID" NUMBER(10,0),
     "ENTERPRISE_ID" NUMBER,
     "CORRECTION_FLG" CHAR(1 BYTE),
     "UDA1" VARCHAR2(200 BYTE),
     "UDA2" VARCHAR2(200 BYTE),
     "SRC_SURGT_KY" VARCHAR2(400 BYTE),
     "SRC_BIZ_KY" VARCHAR2(400 BYTE),
     "MSTR_KY_ROOT_ID" VARCHAR2(400 BYTE),
     "MSTR_KY_EXTN_TXT" VARCHAR2(400 BYTE),
     CONSTRAINT "HDM_INVT_ACCTG_LN_PK" PRIMARY KEY
("ACC_ENT_ID",_"ACC_ENT_VN") )
   ALTER_TABLE_"TARGET"."HDM_INVT_ACCTG_LN" ADD CONSTRAINT
"HDM_INVT_ACCTG_LN_HDM_ACC_FK" FOREIGN KEY ("HDM_ACC_ENT_PK")
   REFERENCES_"TARGET"."HDM_ACC" ("ACC_ENT_ID", "ACC_ENT_VN")
ENABLE;
```

We claim:

1. A method for learning extract, transform, and load ("ETL") mappings by example, the method comprising:
   extracting a plurality of features from a source schema and a target schema, the features comprising at least columns of a plurality of tables of the source schema and the target schema;
   providing example ETL mappings to a machine learning algorithm, wherein the example ETL mappings comprise definitions for extracting data from one or more tables of the source schema and loading the extracted data into one or more tables of the target schema;
   predicting, using the machine learning algorithm and based on the source schema, target schema, and extracted features, one or more ETL rules that define logic for extracting data from the source schema and loading the extracted data into the target schema, wherein at least one predicted ETL rule comprises conditional logic that selectively applies a function to data values extracted from the source schema, the function transforming the data values; and
   generating additional ETL mappings based on the predicted ETL rules, the source schema, the target schema, and the extracted features, the additional ETL mappings providing additional definitions for extracting data from one or more tables of the source schema and loading the extracted data into one or more tables of the target schema, wherein a definition for at least one additional ETL mapping selectively applies the function to data extracted from a source table of the source schema when loading the extracted data into a target table of the target schema.

2. The method of claim 1, wherein the example ETL mappings and additional ETL mappings comprise mapping expressions that define a relationship between one or more source columns of a source table and a target column of a target table.

3. The method of claim 1, wherein the example ETL mappings include a mapping expression that implements at least one of a column name post-fix or a column name pre-fix.

4. The method of claim 1, wherein the at least one predicted ETL rule applies the function to a source column.

5. The method of claim 1, wherein
   the example ETL mappings include a mapping expression that implements the function for loading a first column of the target schema, and
   the additional ETL mappings include a mapping expression that implements the function for loading a second column of the target schema.

6. The method of claim 1, wherein the predicted ETL rules define logic represented by the example ETL mappings.

7. The method of claim 6, wherein,
   the example ETL mappings represent relationships between the source schema and a first set of columns of the target schema, and the predicted ETL rules define logic for relationships between the source schema and a second set of columns of the target schema, and the second set of columns is different from the first set of columns.

8. The method of claim 7, wherein the additional ETL mappings include mapping expressions for the second set of columns of the target schema based on the predicted ETL rules.

9. The method of claim 1, wherein the plurality features comprise foreign keys for tables of the source schema and the target schema.

10. The method of claim 1, wherein the plurality features comprise metadata for columns of the source schema, the metadata indicating relationships between columns of the source schema.

11. The method of claim 1, wherein a rules interpreter generates the at least one additional ETL mapping by translating the conditional logic of the at least one predicted ETL rule.

12. The method of claim 1, wherein the at least one additional ETL mapping selectively applies the function by applying the function to a first portion of data loaded to a target column of the target table and not applying the function to a second portion of data loaded to the target column of the target table.

13. A non-transitory computer readable medium having instructions stored thereon that, when executed by a processor, cause the processor to learn extract, transform, and load ("ETL") mappings by example, the learning comprising:
   extracting a plurality of features from a source schema and a target schema, the features comprising at least columns of a plurality of tables of the source schema and the target schema;
   providing example ETL mappings to a machine learning algorithm, wherein the example ETL mappings comprise definitions for extracting data from one or more tables of the source schema and loading the extracted data into one or more tables of the target schema;
   predicting, using the machine learning algorithm and based on the source schema, target schema, and extracted features, one or more ETL rules that define logic for extracting data from the source schema and loading the extracted data into the target schema, wherein at least one predicted ETL rule comprises conditional logic that selectively applies a function to data values extracted from the source schema, the function transforming the data values; and
   generating additional ETL mappings based on the predicted ETL rules, the source schema, the target schema, and the extracted features, the additional ETL mappings providing additional definitions for extracting data from one or more tables of the source schema and loading the extracted data into one or more tables of the target schema, wherein a definition for at least one additional ETL mapping selectively applies the function to data extracted from a source table of the source schema when loading the extracted data into a target table of the target schema.

14. The computer readable medium of claim 13, wherein the example ETL mappings include a mapping expression that implements at least one of a column name post-fix or a column name pre-fix.

15. The computer readable medium of claim 13, wherein the example ETL mappings include a mapping expression that implements the function for loading a first column of the target schema, and
the additional ETL mappings include a mapping expression that implements the function for loading a second column of the target schema.

16. The computer readable medium of claim 13, wherein the predicted ETL rules define logic represented by the example ETL mappings.

17. The computer readable medium of claim 13, wherein, the example ETL mappings represent relationships between the source schema and a first set of columns of the target schema, and
the predicted ETL rules define logic for relationships between the source schema and a second set of columns of the target schema, and the second set of columns is different from the first set of columns.

18. The computer readable medium of claim 17, wherein the additional ETL mappings include mapping expressions for the second set of columns of the target schema based on the predicted ETL rules.

19. A system comprising:
   a processing device in communication with a memory device, the processing device configured to learn extract, transform, and load ("ETL") mappings by example, the learning comprising:
   extracting a plurality of features from a source schema and a target schema, the features comprising at least columns of a plurality of tables of the source schema and the target schema;
   providing example ETL mappings to a machine learning algorithm, wherein the example ETL mappings comprise definitions for extracting data from one or more tables of the source schema and loading the extracted data into one or more tables of the target schema;
   predicting, using the machine learning algorithm and based on the source schema, target schema, and extracted features, one or more ETL rules that define logic for extracting data from the source schema and loading the extracted data into the target schema, wherein at least one predicted ETL rule comprises conditional logic that selectively applies a function to data values extracted from the source schema, the function transforming the data values; and
   generating additional ETL mappings based on the predicted ETL rules, the source schema, the target schema, and the extracted features, the additional ETL mappings providing additional definitions for extracting data from one or more tables of the source schema and loading the extracted data into one or more tables of the target schema, wherein a definition for at least one additional ETL mapping selectively applies the function to data extracted from a source table of the source schema when loading the extracted data into a target table of the target schema.

20. The system of claim 19, wherein
the example ETL mappings include a mapping expression that implements the function for loading a first column of the target schema, and
the additional ETL mappings include a mapping expression that implements the function for loading a second column of the target schema.

* * * * *